United States Patent
Feng et al.

(10) Patent No.: US 12,528,971 B2
(45) Date of Patent: Jan. 20, 2026

(54) COATING COMPOSITION CONTAINING TMCD POLYESTER AND A MODIFYING POLYESTER

(71) Applicant: Eastman Chemical Company, Kingsport, TN (US)

(72) Inventors: Linqian Feng, Johnson City, TN (US); Cameron Lee Brown, Kingsport, TN (US); John Thorton Maddox, Jonesborough, TN (US); Alain Michel Cagnard, Kingsport, TN (US); Selene Ayde De Leon Ibarra, Kingsport, TN (US); Thauming Kuo, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 460 days.

(21) Appl. No.: 18/247,890

(22) PCT Filed: Oct. 21, 2021

(86) PCT No.: PCT/US2021/055988
§ 371 (c)(1),
(2) Date: Apr. 5, 2023

(87) PCT Pub. No.: WO2022/093616
PCT Pub. Date: May 5, 2022

(65) Prior Publication Data
US 2023/0374341 A1 Nov. 23, 2023

Related U.S. Application Data

(60) Provisional application No. 63/106,066, filed on Oct. 27, 2020.

(51) Int. Cl.
| | | |
|---|---|---|
| C09D 175/06 | (2006.01) | |
| B65D 25/14 | (2006.01) | |
| C08G 18/40 | (2006.01) | |
| C08G 18/42 | (2006.01) | |
| C08G 18/54 | (2006.01) | |
| C08G 18/75 | (2006.01) | |
| C08G 63/199 | (2006.01) | |
| C08G 63/20 | (2006.01) | |
| C08G 63/85 | (2006.01) | |

(52) U.S. Cl.
CPC .......... *C09D 175/06* (2013.01); *B65D 25/14* (2013.01); *C08G 18/4027* (2013.01); *C08G 18/423* (2013.01); *C08G 18/542* (2013.01); *C08G 18/755* (2013.01); *C08G 63/199* (2013.01); *C08G 63/20* (2013.01); *C08G 63/85* (2013.01)

(58) Field of Classification Search
CPC .... C08G 63/20; C08G 63/199; C09D 175/06; B65D 25/14
See application file for complete search history.

(56) References Cited

U.S. PATENT DOCUMENTS

| | | |
|---|---|---|
| 8,101,705 B2 | 1/2012 | Crawford et al. |
| 8,519,055 B2 | 8/2013 | Marsh et al. |
| 9,487,619 B2 | 11/2016 | Kuo et al. |
| 2012/0202920 A1 | 8/2012 | Marsh et al. |
| 2014/0296407 A1 | 10/2014 | Marsh et al. |
| 2018/0223126 A1* | 8/2018 | Beccaria ............... C08G 63/183 |
| 2019/0338063 A1 | 11/2019 | Powell et al. |

OTHER PUBLICATIONS

Notification of Transmittal of The International Search Report and The Written Opinion of the International Searching Authority, or the Declaration; PCT/US2021/55988 with a date of mailing Jan. 21, 2022.

* cited by examiner

*Primary Examiner* — Christopher M Rodd
(74) *Attorney, Agent, or Firm* — Polly C. Owen; Judith C. Rawls

(57) ABSTRACT

This invention pertains to coating compositions based on polyesters containing 2,2,4,4-tetrametbyM,3-cyclobutanediol (TMCD) and modifying polyester polyols. Coatings based on such polyester blends are capable of providing a good balance of the desirable coating properties, such as solvent resistance, acid resistance, retort resistance, crazing resistance, and bending ability, for metal packaging applications.

19 Claims, No Drawings

COATING COMPOSITION CONTAINING TMCD POLYESTER AND A MODIFYING POLYESTER

CROSS-REFERENCE TO RELATED APPLICATION(S)

This application is a national stage filing under 35 USC § 371 of International Application Number PCT/US2021/055988, filed on, Oct. 21, 2021 which claims the benefit of the filing date to U.S. Provisional Application No. 63/106,066, filed on Oct. 27, 2020, the entire disclosures of which are incorporated by reference herein.

FIELD OF THE INVENTION

This application relates to chemistry in general. In particular, this application relates to polyester compositions. More particularly this application relates to polyester compositions containing 2,2,4,4-tetramethyl-1,3-cyclobutanediol (TMCD) for use in coating metals.

BACKGROUND OF THE INVENTION

Metal containers are commonly used for food and beverage packaging. The containers are typically made of steel or aluminum. A prolonged contact between the metal and the filled product can lead to corrosion of the container. To prevent direct contact between filled product and metal, a coating is typically applied to the interior of the food and beverage cans. In order to be effective, such a coating must have adequate properties that are needed for protecting the packaged products, such as adhesion, corrosion resistance, chemical resistance, flexibility, stain resistance, and hydrolytic stability. Moreover, the coating must be able to withstand processing conditions during can fabrication and food sterilization. Coatings based on a combination of epoxy and phenolic resins are known to be able to provide a good balance of the required properties and are most widely used. Some industry sectors are moving away from food contact polymers made with bisphenol A (BPA), a basic building block of epoxy resins. Thus, there exists a need for non-BPA containing coatings for use in interior can coatings.

Polyester resins are of particular interest to the coating industry to be used as a replacement for epoxy resin because of their comparable properties such as flexibility and adhesion. It is known by one skilled in the art that crosslinking between common polyester and phenolic resin is too poor to provide adequate properties for use in interior can coatings. Specifically, conventional polyesters having hydroxyl functionalities are not reactive enough with phenolic resins under curing conditions to provide adequate cross-linking density, resulting a coating that lacks good solvent resistance.

2,2,4,4-Tetramethyl-1,3-cyclobutanediol (TMCD) is a cycloaliphatic compound that can be used as a diol component for making polyesters. Thermoplastics based on TMCD polyester exhibit exceptional impact resistance owing to TMCD's unique structure. TMCD can also provide good hydrolytic stability of the polyester due to its secondary hydroxyl functionality. Both of these properties are highly desirable in thermosetting coatings.

Coatings based on TMCD polyesters have been considered as replacements for epoxy resins for interior can coating application. Prior efforts have been directed to coating systems based on high Tg, mid-molecular weight TMCD polyesters with slight crosslinking in order to withstand processing conditions during can fabrication. Such systems, however, have been found to have shortcomings in some of the desired properties such as corrosion resistance, retort resistance, and crazing (microcracking) resistance. Higher crosslinking can lead to improved coating properties such as corrosion resistance, acid resistance, stain resistance, and retort resistance. Such coatings, however, tend to be less flexible, which can have detrimental effects on crazing resistance and bending ability during processing. Thus, there remains a need for a suitable coating composition that can provide a good balance of the desirable coating properties for metal packaging applications.

SUMMARY OF THE INVENTION

A coating composition for metal packaging application, comprising:
a. a 2,2,4,4-Tetramethyl-1,3-cyclobutanediol (TMCD) polyester, which is the reaction product of the monomers comprising:
  i. TMCD in an amount of 35-80 mole %, based on the total moles of (a)(i-iv),
  1,4-cyclohexanedimethanol (1,4-CHDM) in an amount of 20-65 mole %, based on the total moles of (a)(i-iv),
  iii. a diol other than TMCD and other than 1,4-CHDM in an amount of 0-25 mole %, based on the total moles of (a)(i-iv),
  iv. trimethylolpropane (TMP) in an amount of 0-5 mole %, based on the total moles of (a)(i-iv),
  v. an aromatic diacid in an amount of 90-100 mole %, based on the total moles of (a)(v-vi), and
  vi. an aliphatic diacid in an amount of 0-10 mole %, based on the total moles of (a)(v-vi),
b. a modifying polyester which is the reaction product of the monomers comprising:
  i. a cyclic diol in an amount of 30-55 mole %, based on the total moles of (b)(i-iii),
  ii. 2-methyl-1,3-propanediol (MPdiol) in an amount of 30-67 mole %, based on the total moles of (b)(i-iii),
  iii. trimethylolpropane (TMP) in an amount of 3-20 mole %, based on the total moles of (b)(i-iii),
  iv. terephthalic acid (TPA) or isophthalic acid (IPA) or a mixture thereof in an amount of 55-85 mole %, based on the total moles of (b)(iv-v), and
  v. an aliphatic diacid in an amount of 15-45 mole 15-45 mole %, based on the total moles of (b)(iv-v), and
c. one or more crosslinkers selected from the group consisting of resole phenolic resin, isocyanate, and amino resin crosslinkers,
wherein said TMCD polyester has a glass transition temperature (Tg) of 60-110° C., acid number of 0-8 mg KOH/g), hydroxyl number of 3-25 mgKOH/g, number average molecular weight of 5,000-20,000 g/mole, and weight average molecular weight of 10,000-100,000 g/mole; said modifying polyester has a Tg of 20-50° C., acid number of 0-10 mg KOH/g, hydroxyl number of 30-60 mgKOH/g, Mn of 2,000-10,000 g/mole, and Mw of 10,000-150,000 g/mole; and wherein said coating has a solvent resistance of greater than 70 MEK double rubs as measured by ASTM 07835, a wedge bend resistance (% pass) of 60-100 as measured by the method of ASTM D3281.

A coating composition for metal packaging application, which comprises:
a. a 2,2,4,4-Tetramethyl-1,3-cyclobutanediol (TMCD) polyester in an amount of 30-40 weight % based on the total weight of (a), (b), (c), and (d), which is the reaction product of the monomers comprising:
   i. TMCD in an amount of 35-80 mole %, based on the total moles of (a)(i-iv),
   ii. 1,4-cyclohexanedimethanol (1,4-CHDM) in an amount of 20-65 mole %, based on the total moles of (a)(i-iv),
   iii. a diol other than TMCD and other than 1,4-CHDM in an amount of 0-25 mole %, based on the total moles of (a)(i-iv),
   iv. trimethylolpropane (TMP) in an amount of 0-5 mole %, based on the total moles of (a)(i-iv),
   v. an aromatic diacid in an amount of 90-100 mole %, based on the total moles of (a)(v-vi), and
   vi. an aliphatic diacid in an amount of 0-10 mole %, based on the total moles of (a)(v-vi),
b. a modifying polyester in an amount of 30-40 weight % based on the total weight of (a), (b), (c), and (d), which is the reaction product of the monomers comprising:
   i. a cyclic diol in an amount of 30-55 mole %, based on the total moles of (b)(i-iii),
   ii. 2-methyl-1,3-propanediol (MPdiol) in an amount of 30-67 mole %, based on the total moles of (b)(i-iii),
   iii. trimethylolpropane (TMP) in an amount of 3-20 mole %, based on the total moles of (b)(i-iii),
   iv. terephthalic acid (TPA) or isophthalic acid (IPA) or a mixture thereof in an amount of 55-85 mole %, based on the total moles of (b)(iv-v), and
   v. an aliphatic diacid in an amount of 15-45 mole %, based on the total moles of (b)(iv-v),
c. a resole phenolic resin in an amount of 15-30 weight % based on the total weight of (a), (b), and (c), and
d. isophorone diisocyanate (IPDI) in an amount of 5-15 weight % based on the total weight of (a), (b), and (c), wherein said TMCD polyester has a glass transition temperature (Tg) of 60-110° C., acid number of 0-8 mg KOH/g), hydroxyl number of 3-25 mgKOH/g, number average molecular weight (Mn) of 5,000-20,000 g/mole, and weight average molecular weight (Mw) of 10,000-100,000 g/mole; said modifying polyester has a Tg of 20-50° C., acid number of 0-10 mg KOH/g, hydroxyl number of 30-60 mgKOH/g, Mn of 2,000-10,000 g/mole, and Mw of 10,000-150,000 g/mole; and wherein said coating has a solvent resistance of greater than 70 MEK double rubs as measured by ASTM D7835, a wedge bend resistance (% pass) of 60-100 as measured by the method of ASTM D3281.

DETAILED DESCRIPTION

In this specification and in the claims that follow, reference will be made to a number of terms, which shall be defined to have the following meanings.

"Alcohol" means a chemical containing one or more hydroxyl groups.

"Aldehyde" means a chemical containing one or more —C(O)H groups.

"Acyclic" means a compound or molecule having no rings of atoms in the compound's structure.

"Aliphatic" means a compound having a non-aromatic structure.

"Diacid" means a compound having two carboxyl functional groups.

Values may be expressed as "about" or "approximately" a given number. Similarly, ranges may be expressed herein as from "about" one particular value and/or to "about" or another particular value. When such a range is expressed, another aspect includes from the one particular value and/or to the other particular value. Similarly, when values are expressed as approximations, by use of the antecedent "about," it will be understood that the particular value forms another aspect.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "includes," and "include" have the same open-ended meaning as "comprising," "comprises," and "comprise" provided above.

"Chosen from" as used herein can be used with "or" or "and." For example, Y is chosen from A, B, and C means Y can be individually A, B, or C. Alternatively, Y is chosen from A, B, or C means Y can be individually A, B, or C; or a combination of A and B, A and C, B and C, or A, B, and C.

As used herein numerical ranges are intended to include the beginning number in the range and the ending number in the range and all numerical values and ranges in between the beginning and ending range numbers. For example, the range 40° C. to 60° C. includes the ranges 40° C. to 59° C., 41° C. to 60° C., 41.5° C. to 55.75° C. and 40°, 41°, 42°, 43°, etc. through 60° C.

The present inventors have unexpectedly discovered that coating compositions containing TMCD polyester and a modifying polyester polyol provide a good balance of desirable coating properties, such as solvent resistance, acid resistance, retort resistance, crazing resistance, and bending ability, for metal packaging applications. Thus, in one embodiment of the invention, there is provided a coating composition having improved coating properties for metal packaging application, which comprises:
   a. a 2,2,4,4-Tetramethyl-1,3-cyclobutanediol (TMCD) polyester, which is the reaction product of the monomers comprising:
      i. TMCD in an amount of 35-80 mole %, based on the total moles of (a)(i-iv),
      ii. 1,4-cyclohexanedimethanol (1,4-CHDM) in an amount of 20-65 mole %, based on the total moles of (a)(i-iv),
      iii. a diol other than TMCD and other than 1,4-CHDM in an amount of 0-25 mole %, based on the total moles of (a)(i-iv),
      iv. trimethylolpropane (TMP) in an amount of 0-5 mole %, based on the total moles of (a)(i-iv),
      v. an aromatic diacid in an amount of 90-100 mole %, based on the total moles of (a)(v-vi), and
      vi. an aliphatic diacid in an amount of 0-10 mole %, based on the total moles of (a)(v-vi), b. a modifying polyester which is the reaction product of the monomers comprising:
   i. a cyclic diol in an amount of 30-55 mole %, based on the total moles of (b)(i-iii),
   ii. 2-methyl-1,3-propanediol (MPdiol) in an amount of 30-67 mole %, based on the total moles of (b)(i-iii),
   iii. trimethylolpropane (TMP) in an amount of 3-20 mole %, based on the total moles of (b)(i-iii),
   iv. terephthalic acid (TPA) or isophthalic acid (IPA) or a mixture thereof in an amount of 55-85 mole %, based on the total moles of (b)(iv-v), and
   v. an aliphatic diacid in an amount of 15-45 mole %, based on the total moles of (b)(iv-v), and
c. one or more crosslinkers selected from the group consisting of resole phenolic resin, isocyanate, and amino resin crosslinkers,
wherein said TMCD polyester has a glass transition temperature (Tg) of 60-110° C., acid number of 0-8 mg KOH/g, hydroxyl number of 3-25 mgKOH/g, number average molecular weight (Mn) of 5,000-20,000 g/mole, and weight average molecular weight (Mw) of 10,000-100,000 g/mole; said modifying polyester has a Tg of 20-50° C., acid number of 0-10 mg KOH/g, hydroxyl number of 30-60 mgKOH/g, Mn of 2,000-10,000 g/mole, and Mw of 10,000-150,000 g/mole; and wherein said coating has a solvent resistance of greater than 70 MEK double rubs as measured by ASTM D7835, a wedge bend resistance (% pass) of 60-100 as measured by the method of ASTM D3281.

In a further embodiment, said coating has a crazing resistance rating of pass and a total retort resistance rating (%) of 60-100 as measured by the methods specified in the example section.

In some embodiments of the invention said TMCD (a)(i) is in an amount of 35-80, 38-70, 40-65, 40-60, 40-55, 40-50, or 40-45 mole %, based on the total moles of (a)(i-iv).

In some embodiments of the invention said 1,4-CHDM (a)(ii) is in an amount of 20-65, 25-60, 30-55, 35-50, or 40-45 mole %, based on the total moles of (a)(i-iv).

In some embodiments of the invention said diol (a)(iii) other than TMCD and other than 1,4-CHDM in an amount of 0-25, 0-20, 0-15, 0-10, or 0-5 mole %, based on the total moles of (a)(i-iv).

In some embodiments of the invention said TMP (a)(iv) is in an amount of 0-5, 0-4, 0-3, 0-2, or 0-1 mole %, based on the total moles of (a)(i-iv).

In some embodiments of the invention an aromatic diacid (a)(v) in an amount of 90-100, 95-100, or 97-100 mole %, based on the total moles of (a)(v-vi).

In some embodiments of the invention said aliphatic diacid (a)(vi) is in an amount of 0-10, 0-5, or 0-3 mole %, based on the total moles of (a)(v-vi).

In another embodiment, TMCD (a)(i) is in an amount of 40-65 mole %, 1,4-CHDM (a)(ii) is in an amount of 35-60 mole %, the diol other than TMCD and other than 1,4-CHDM (a)(iii) is in an amount of 0-15 mole %, TMP (a)(iv) is in an amount of 0-2 mole %; based on the total moles of (a)(i-iv) and the aromatic diacid (a)(v) is in an amount of 97-100 mole %, and the aliphatic diacid (a)(vi) is in an amount of 0-3 mole % based on the total moles of (a)(v-vi).

Said diol (a)(iii) other than TMCD and other than 1,4-CHDM includes 1,6-hexanediol, 2-methyl-1,3-propanediol (MPdiol), neopentyl glycol, 1,3-cyclohexanedimethanol (1,3-CHDM), and mixtures thereof. Desirably, said diol other than TMCD and other than 1,4-CHDM is 1,6-hexanediol, MPdiol, or a mixture thereof.

Said aromatic diacid (a)(v) includes IPA, TPA, dimethyl isophthalate, dimethyl terephthalate, and mixtures thereof. Desirably said aromatic diacid is IPA, TPA, or a mixture thereof.

Said aliphatic diacid (a)(vi) includes adipic acid, cyclohexane dicarboxylic acid, dimethyl cyclohexane dicarboxylate, and mixtures thereof. Desirably, said aliphatic diacid is adipic acid, 1,4-cyclohexane dicarboxylic acid, or a mixture thereof.

Said TMCD polyester (a) has a glass transition temperature (Tg) of 60-110° C., 60-100° C., 60-95° C., 60-90° C., 65-100° C., 65-95° C., 65-90° C., 70-110, 70-100° C., 70-95° C., 70-90° C., 75-100° C., 75-95° C., 75-90° C., 80-100° C., 80-95° C., or 80-90° C.

Said TMCD polyester (a) has a number average weight (Mn) of 5,000-20,000, 6,000-15,000, or 7,000-13,000 g/mole; and weight average weight (Mw) of 10,000-100,000, 20,000-90,000, or 30,000-80,000 g/mole.

Said TMCD polyester (a) has an acid number of 0-8, 0-5, 0-3, 0-2, 0-1, 1-5, 1-4, 1-3, 1-2, 2-5, 2-4, 2-3, 3-5, or 3-4 mgKOH/g.

Said TMCD polyester (a) has a hydroxyl number of 3-25, 5-25, 10-25, or 10-22 mgKOH/g.

In some embodiments of the invention said cyclic diol (b)(i) is present in an amount of 30-55, 35-50, or 40-45 mole %, based on the total moles of (b)(i-iii)

In some embodiments of the invention said MPdiol (b)(ii) is present in an amount of 30-67, 35-60, or 40-55 mole %, based on the total moles of (b)(i)-(iii).

In some embodiments of the invention said TMP (b)(iii) is present in an amount of 3-20, 4-15, or 5-12 mole %, based on the total moles of (b)(i)-(iii).

In some embodiments of the invention said TPA and/or IPA (b)(iv) is present in an amount of 55-85, 60-80, or 65-75 mole %, based on the total moles of (b)(iv)-(v).

In some embodiments of the invention said aliphatic diacid (b)(v) is present in an amount of 15-45, 20-40, or 25-35 mole %, based on the total moles of (b)(iv)-(v).

In another embodiment, said cyclic diol (b)(i) is present in an amount of 40-45 mole % based on the total moles of (b)(i)-(iii), said MPdiol (b)(ii) is present in an amount of 40-55 mole (based on the total moles of (b)(i)-(iii), said TMP (b)(iii) is present in an amount of 5-12 mole % (b)(i)-(iii) based on the total moles of (b)(i)-(iii); said TPA and/or IPA (b)(iv) is present in an amount of 65-75 mole % based on the total moles of (b)(iv)-(v), and said aliphatic diacid (b)(v) is present in an amount of 25-35 mole % based on the total moles of (b)(iv)-(v).

Said cyclic diol (b)(i) includes tricyclodecanedimethanol (TCDDM), TMCD, isosorbide, 1,4-CHDM, 1,3-CHDM, and mixtures thereof. Desirably, said cyclic diol is TCDDM, TMCD, or a mixture thereof.

Said TCDDM (formula 1) is a mixture of isomers of 4,8-bis(hydroxymethyl)tricyclo[5.2.1.0$^{2,6}$]decane. TCDDM is also known as tricyclodecanedimethanol and tricyclo[5.2.1.0$^{2,6}$]decane-4,8-dimethanol. TCDDM is available from OQ Chemicals as TCD Alcohol DM.

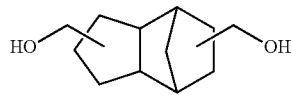

Formula 1

Said TPA includes terephthalic acid and its esters such as dimethyl terephthalate.

Said IPA includes isophthalic acid and its esters such as dimethyl isophthalate.

Said aliphatic diacid (b)(v) includes $C_4$-$C_{12}$ diacids and their esters, such as succinic acid, adipic acid, sebacic acid, dodecanedioic acid, cyclohexane dicarboxylic acid, and their methyl esters; and (hydrogenated) dimer acid ($C_{36}$). Desirably, when longer-chain diacids (>$C_{10}$) are used, they are at a smaller ratio such as 15-25, 15-20, or 15-17 mole %. In one aspect, said aliphatic diacid is sebacic, adipic acid, or a mixture thereof at a ratio of 25-35 mole %.

Said modifying polyester has a glass transition temperature (Tg) of 20-50° C., 20-45° C., 20-40° C., 23-38° C., or 25-35° C.

Said modifying polyester has a number average weight of 2,000-10,000, 3,000-9,000, or 4,000-8,000 g/mole; weight average weight of 10,000-150,000, 15,000-130,000, or 20,000-100,000 g/mole.

Said modifying polyester has an acid number of 0-10, 0-8, 0-5, 0-3, 0-2, or 0-1 mgKOH/g.

Said modifying polyester has a hydroxyl number of 30-60, 35-55, or 40-50 mgKOH/g.

In another embodiment of the invention, TMCD polyester (a) is in an amount of 40-95, 45-90, 45-85, 45-80, 45-75, 45-70, 45-65, 45-60, 45-55, 50-90, 50-85, 50-80, 50-75, 50-70, 50-65, 50-60, 55-90, 55-85, 55-80, 55-75, 55-70, 55-65, 60-90, 60-85, 60-80, 60-75, 60-70, 65-90, 65-85, 65-80, 65-75, 70-90, 70-85, 70-80, 75-90, 75-85, or 80-90 weight % and the modifying polyester (b) is in amount of 5-60, 10-55, 15-55, 20-55, 25-55, 30-55, 35-55, 40-55, 45-55, 10-50, 15-50, 20-50, 25-50, 30-50, 35-50, 40-50, 10-45, 15-45, 20-45, 25-45, 30-45, 35-45, 10-40, 15-40, 20-40, 25-40, 30-40, 10-35, 15-35, 20-35, 25-35, 10-30, 15-30, 20-30, 10-25, 15-25, or 10-20 weight %, based on the total weight of (a) and (b). Desirably, TMCD polyester (a) is 45-65 and the modifying polyester (b) is 35-55 weight % based on the total weight % of (a) and (b).

Said crosslinker (c) is one or more selected from the group consisting of resole phenolic resin, isocyanate, and amino resin crosslinkers. Desirably, the crosslinker is resole phenolic resin, isocyanate, or a mixture thereof.

Said resole phenolic resin contains the residues of un-substituted phenol and/or meta-substituted phenols. These particular resole resins exhibit good reactivity with said polyester polyol (a). Desirably, the amount of the resole phenolic resin is at least 50 wt. % or greater than 60 wt. % or greater than 70 wt. % or greater than 80 wt. % or greater than 90 wt. % based on the weight of all cross-linker compounds.

The resole phenolic resin present in the crosslinking composition contains methylol groups on the phenolic rings. Phenolic resins having methylol functionalities are referred to as resole type phenolic resins. As is known in the art, the methylol group (—$CH_2OH$) may be etherated with an alcohol and present as —$CH_2OR$, wherein R is C1-C8 alkyl group, in order to improve resin properties such as storage stability and compatibility. For purpose of the description, the term "methylol" used herein includes both —$CH_2OH$ and —$CH_2OR$ and an un-substituted methylol group is $CH_2OH$. Said methylol groups (either —$CH_2OH$ or —$CH_2OR$) are the end groups attached to the resole resins. The methylol groups are formed during the resole resin synthesis and can further react with another molecule to form ether or methylene linkages leading to macromolecules.

The phenolic resin contains the residues of un-substituted phenols or meta-substituted phenols. When starting with phenol or meta-substituted phenols to make a resole, the para and ortho positions are both available for bridging reactions to form a branched network with final methylol end groups on the resin being in the para or ortho positions relative to the phenolic hydroxyl group. To make the phenolic resole, a phenol composition is used as a starting material. The phenol composition contains un-substituted and/or meta-substituted phenols. The amount of un-substituted, meta-substituted, or a combination of the two, that is present in the phenol compositions used as a reactant to make the phenolic resole resin, is at least 50 wt. %, or at least 60 wt. %, or at least 70 wt. %, or at least 75 wt. %, or at least 80 wt. %, or at least 85 wt. %, or at least 90 wt. %, or at least 95 wt. %, or at least 98 wt. %, based on the weight of the phenol composition used as a reactant starting material.

The phenol composition is reacted with a reactive compound such as an aldehyde at an aldehyde:phenol molar ratio (using aldehyde as an example) of greater than 1:1, or at least 1.05:1, or at least 1.1:1, or at least 1.2:1, or at least 1.25:1, or at least 1.3:1, or at least 1.35:1, or at least 1.4:1, or at least 1.45:1, or at least 1.5:1, or at least 1.55:1, or at least 1.6:1, or at least 1.65:1, or at least 1.7:1, or at least 1.75:1, or at least 1.8:1, or at least 1.85:1, or at least 1.9:1, or at least 1.95:1, or at least 2:1. The upper amount of aldehyde is not limited and can be as high as 30:1, but generally is up to 5:1, or up to 4:1, or up to 3:1, or up to 2.5:1. Typically, the ratio of aldehyde:phenol is at least 1.2:1 or more, or 1.4:1 or more or 1.5:1 or more, and typically up to 3:1. Desirably, these ratios also apply to the aldehyde/unsubstituted phenol or meta-substituted phenol ratio.

The resole phenolic resin can contain an average of at least 0.3, or at least 0.4, or at least 0.45, or at least 0.5, or at least 0.6, or at least 0.8, or at least 0.9 methylol groups per one phenolic hydroxyl group, and "methylol" includes both —$CH_2OH$ and —$CH_2OR$.

The phenolic resin obtained by the condensation of phenols with aldehydes of the general formula (RCHO)n, where R is hydrogen or a hydrocarbon group having 1 to 8 carbon atoms and n is 1, 2, or 3. Examples include formaldehyde, paraldehyde, acetaldehyde, glyoxal, propionaldehyde, furfuraldehyde, or benzaldehyde. Desirably, the phenolic resin is the reaction product of phenols with formaldehyde.

At least a part of the crosslinker in (c) comprises a resole type phenolic resin that is prepared by reacting either un-substituted phenol or meta-substituted phenol or a combination thereof with an aldehyde. The unsubstituted phenol is phenol ($C_6H_5OH$). Examples of meta-substituted phenols include m-cresol, m-ethylphenol, m-propylphenol, m-butylphenol, moctylphenol, m-alkylphenol, m-phenylphenol, m-alkoxyphenol, 3,5-xylenol, 3,5-diethyl phenol, 3,5-dibutyl phenol, 3,5-dialkylphenol, 3,5-dicyclohexyl phenol, 3,5-dimethoxy phenol, 3-alkyl-5-alkyoxy phenol, and the like.

Although other substituted phenol compounds can be used in combination with said un-substituted phenols or meta-substituted phenols for making phenolic resins, it is desirable that at least 50%, or at least 70%, or at least 80%, or at least 90%, or at least 95%, or at least 98%, or at least 100% of the phenolic compounds used to make the resole resin are unsubstituted phenol or meta-substituted phenol.

In one aspect, the resole phenolic resin used in this invention comprises residues of m-substituted phenol.

Examples of suitable commercial phenolic resins include, but are not limited to, PHENODUR® PR 516/60B (based on cresol and formaldehyde) available from Allnex, PHENODUR® PR 371/70B (based on unsubstituted phenol and formaldehyde) also available from Allnex, and CURAPHEN 40-856 B60 (based on m-cresol and formaldehyde) available from Bitrez.

The phenolic resins are desirably heat curable. The phenolic resin is desirably not made by the addition of bisphenol A, F, or S (collectively "BPA").

The resole is desirably of the type that is soluble in alcohol. The resole resin can be liquid at 25° C. The resole resin can have a weight average molecular weight from 200 to 2000, generally from 300 to 1000, or from 400 to 800, or from 500 to 600.

The isocyanate crosslinker suitable for this invention may be blocked or unblocked isocyanate type. Examples of suitable isocyanate crosslinkers include, but are not limited to, 1,6-hexamethylene diisocyanate, methylene bis(4-cyclohexyl isocyanate), and isophorone diisocyanate. Desirably, the isocyanate crosslinker is isophorone diisocyanate (IPDI) or blocked IPDI available from COVESTRO as Desmodur® BL 2078/2.

In another embodiment, the crosslinker (c) is a mixture of resole phenolic resin in an amount of 70-90 weight % and isocyanate in an amount of 10-30 weight %, based on the total weight of the crosslinkers.

In another embodiment of the invention, the total amount of TMCD polyester (a) and the modifying polyester (b) is in an amount of 50-90 weight % and said crosslinker (c) in an amount of 10-50 weight %, based on the total weight of (a), (b), and (c).

In some embodiments, the total amount of TMCD polyester (a) and the modifying polyester (b) is in 55-85, 55-80, 55-75, 55-70, 60-85, 60-80, 60-75, 60-70, 65-85, 65-80, 65-75, 70-90, 70-85, 70-80, 75-85, 80-90, or 80-85 weight %; and the crosslinker (c) in 15-45, 20-45, 25-45, 30-45, 15-40, 20-40, 25-40, 30-40, 15-35, 20-35, 25-35, 10-30, 15-30, 20-30, 15-25, 10-20, or 15-20 weight %.

In addition to resole phenolic resin and isocyanate, said crosslinker (c) may also be amino resin. The amino resin crosslinker (or cross-linking agent) can be a melamine-formaldehyde type or benzoguanamine-formaldehyde type cross-linking agent, i.e., a cross-linking agent having a plurality of —N(CH$_2$OR$^3$)$_2$ functional groups, wherein R$^3$ is C1-C4 alkyl, preferably methyl.

In still another embodiment, the crosslinker (c) is a mixture of amino resin in an amount of 65-85 weight % and isocyanate in an amount of 15-35 weight %, based on the total weight of the crosslinkers.

In general, the amino cross-linking agent may be selected from compounds of the following formulae, wherein R$^3$ is independently C1-C4 alkyl:

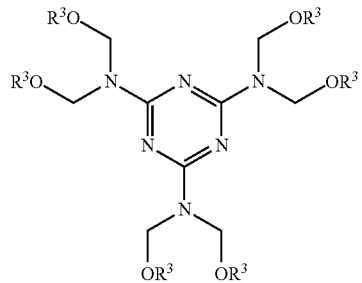

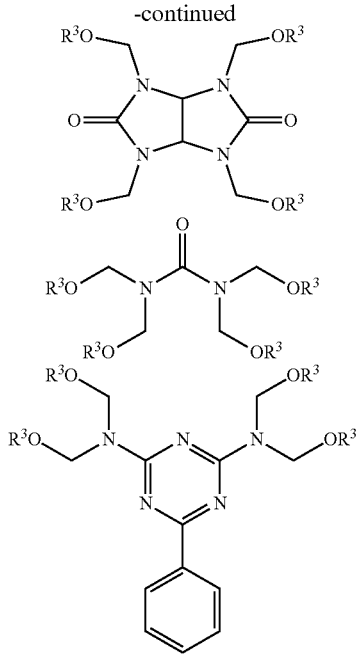

The amino containing cross-linking agents are desirably hexamethoxymethyl-melamine, hexabutoxymethylmelamine, tetramethoxymethylbenzoguanamine, tetrabutoxymethylbenzoguanamine, tetramethoxymethylurea, mixed butoxy/methoxy substituted melamines, and the like.

Desirably, in all the types of thermosetting compositions, the cross-linker composition contains greater than 50 wt. % or greater than 60 wt. % or greater than 70 wt. % or greater than 80 wt. % or greater than 90 wt. % resole phenolic resin, based on the weight of the cross-linker composition. In addition to or in the alternative, the remainder of the cross-linking compounds in the cross-linking composition, if any, are amine based crosslinking compounds as described above and/or isocyanate crosslinker.

Any of the thermosetting compositions of the invention can also include one or more cross-linking catalysts. Representative crosslinking catalysts include carboxylic acids, sulfonic acids, tertiary amines, tertiary phosphines, tin compounds, or combinations of these compounds. Some specific examples of crosslinking catalysts include p-toluenesulfonic acid, phosphoric acid, NACURE™ 155, 5076, 1051, and XC-296B catalysts sold by King Industries, BYK 450, 470, available from BYK-Chemie U.S.A., methyl tolyl sulfonimide, p-toluenesulfonic acid, dodecylbenzene sulfonic acid, dinonylnaphthalene sulfonic acid, and dinonylnaphthalene disulfonic acid, benzoic acid, triphenylphosphine, dibutyltindilaurate, and dibutyltindiacetate.

The crosslinking catalyst can depend on the type of crosslinker that is used in the coating composition. For example, the crosslinker can comprise a melamine or "amino" crosslinker and the crosslinking catalyst can comprise p-toluenesulfonic acid, phosphoric acid, unblocked and blocked dodecylbenzene sulfonic (abbreviated herein as "DDBSA"), dinonylnaphthalene sulfonic acid (abbreviated herein as "DNNSA") and dinonylnaphthalene disulfonic acid (abbreviated herein as "DNNDSA"). Some of these catalysts are available commercially under trademarks such as, for example, NACURE™ 155, 5076, 1051, 5225, and XC-296B (available from King Industries), BYK-CATALYSTS™ (available from BYK-Chemie USA), and CYCAT™ catalysts (available from Cytec Surface Specialties). The coating compositions of the invention can comprise one or more isocyanate crosslinking catalysts such as, for example, FASCAT™ 4202 (dibutyltindilaurate), FASCAT™ 4200 (dibutyltindiacetate, both available from Arkema), DABCO™ T-12 (available from Air Products) and K-KAT™ 348, 4205, 5218, XC-6212 non-tin catalysts (available from King Industries), and tertiary amines.

The coating composition can contain an acid or base catalyst in an amount ranging from 0.1 to 2 weight %, based on the total weight of any of the aforementioned curable polyester resins and the crosslinker composition.

In another embodiment, the coating composition of the present invention further comprises one or more organic solvents. Suitable organic solvents include xylene, ketones (for example, methyl amyl ketone), 2-butoxyethanol, ethyl-3-ethoxypropionate, toluene, butanol, cyclopentanone, cyclohexanone, ethyl acetate, butyl acetate, Aromatic 100 and Aromatic 150 (both available from ExxonMobil), and other volatile inert solvents typically used in industrial baking (i.e., thermosetting) enamels, mineral spirits, naptha, toluene, acetone, methyl ethyl ketone, methyl isoamyl ketone, isobutyl acetate, t-butyl acetate, n-propyl acetate, isopropyl acetate, methyl acetate, ethanol, n-propanol, isopropanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol mono-isobutyrate, ethylene glycol mono-octyl ether, diacetone alcohol, 2,2,4-trimethyl-1,3-pentanediol monoisobutyrate (available commercially from Eastman Chemical Company under the trademark TEXANOL™), or combinations thereof.

The amount of solvents is desirably at least 20 wt. %, or at least 25 wt. %, or at least 30 wt. %, or at least 35 wt. %, or at least 40 wt. %, or at least 45 wt. %, or at least 50 wt. %, or at least 55 wt. % based on the weight of the solvent containing coating composition. Additionally or in the alternative, the amount of organic solvents can be up to 85 wt. % based on the weight of the coating composition.

In some embodiments of the invention, the coating has MEK double rubs of 70 to 100 or greater, 80 to 100 or greater, or 90 to 100 or greater as measured by the method of ASTM D7835; a wedge bend resistance (% pass) of 60-100, 65-100, 70-100, 75-100, or 80-100 as measured by the method of ASTM D3281. In further embodiments of the invention, the coating has a crazing resistance rating of pass and a total retort resistance rating (%) of 60-100, 70-100, 80-100, or 90-100 as measured by the methods specified in the Example section.

In a further embodiment, this invention provides a coating composition for gold-color coating having improved coating properties for metal packaging application, which comprises:
a. a 2,2,4,4-Tetramethyl-1,3-cyclobutanediol (TMCD) polyester in an amount of 30-40 weight % based on the total weight of (a), (b), (c), and (d), which is the reaction product of the monomers comprising:
   i. TMCD in an amount of 35-80 mole %, based on the total moles of (a)(i-iv),
   ii. 1,4-cyclohexanedimethanol (1,4-CHDM) in an amount of 20-65 mole %, based on the total moles of (a)(i-iv),
   iii. a diol other than TMCD and other than 1,4-CHDM in an amount of 0-25 mole %, based on the total moles of (a)(i-iv),
   iv. trimethylolpropane (TMP) in an amount of 0-5 mole %, based on the total moles of (a)(i-iv),
   v. an aromatic diacid in an amount of 90-100 mole %, based on the total moles of (a)(v-vi), and
   vi. an aliphatic diacid in an amount of 0-10 mole %, based on the total moles of (a)(v-vi),
b. a modifying polyester in an amount of 30-40 weight % based on the total weight of (a), (b), (c), and (d), which is the reaction product of the monomers comprising:
   i. a cyclic diol in an amount of 30-55 mole %, based on the total moles of (b)(i-iii),
   ii. 2-methyl-1,3-propanediol (MPdiol) in an amount of 30-67 mole %, based on the total moles of (b)(i-iii),
   iii. trimethylolpropane (TMP) in an amount of 3-20 mole %, based on the total moles of (b)(i-iii),
   iv. terephthalic acid (TPA) or isophthalic acid (IPA) or a mixture thereof in an amount of 55-85 mole %, based on the total moles of (b)(iv-v), and
   v. an aliphatic diacid in an amount of 15-45 mole %, based on the total moles of (b)(iv-v),
c. a resole phenolic resin in an amount of 15-30 weight % based on the total weight of (a), (b), and (c), and
d. isophorone diisocyanate (IPDI) in an amount of 5-15 weight % based on the total weight of (a), (b), and (c),
wherein said TMCD polyester has a glass transition temperature (Tg) of 60-110° C., acid number of 0-8 mg KOH/g), hydroxyl number of 3-25 mgKOH/g, number average molecular weight (Mn) of 5,000-20,000 g/mole, and weight average molecular weight (Mw) of 10,000-100,000 g/mole; said modifying polyester has a Tg of 20-50° C., acid number of 0-10 mg KOH/g, hydroxyl number of 30-60 mgKOH/g, Mn of 2,000-10,000 g/mole, and Mw of 10,000-150,000 g/mole; and wherein said coating has a solvent resistance of greater than 70 MEK double rubs as measured by ASTM D7835, a wedge bend resistance (% pass) of 60-100 as measured by the method of ASTM D3281.

In a further embodiment, said coating has a crazing resistance rating of pass and a total retort resistance rating (% pass) of 60-100 as measured by the methods specified in the example section.

The coating composition may also comprise at least one pigment. Typically, the pigment is present in an amount of about 20 to about 60 weight percent, based on the total weight of the composition. Examples of suitable pigments include titanium dioxide, barytes, clay, calcium carbonate, and CI Pigment White 6 (titanium dioxide). For example, the solvent-borne, coating formulations can contain titanium dioxide as the white pigment available from CHEMOURS as Ti-Pure™ R 900.

After formulation, the coating composition can be applied to a substrate or article. Thus, a further aspect of the present invention is a shaped or formed article that has been coated with the coating compositions of the present invention. The substrate can be any common substrate such as aluminum, tin, steel or galvanized sheeting; urethane elastomers; primed (painted) substrates; and the like. The coating composition can be coated onto a substrate using techniques known in the art, for example, by spraying, draw-down, roll-coating, etc., about 0.1 to about 4 mils (1 mil=25 μm), or 0.5 to 3, or 0.5 to 2, or 0.5 to 1 mils of wet coating onto a substrate. The coating can be cured at a temperature of about 50° C. to about 230° C., for a time period that ranges from about 5 seconds to about 90 minutes and allowed to cool. Examples of coated articles include metal cans for food and beverages, in which the interiors are coated with the coating composition of the present invention.

Thus, this invention further provides an article, of which at least a portion is coated with the coating composition of the present invention.

EXAMPLES

This invention can be further illustrated by the following examples thereof, although it will be understood that these examples are included merely for purposes of illustration and are not intended to limit the scope of the invention unless otherwise specifically indicated.

Abbreviations:

mL is milliliter; wt % is weight percent; eq is equivalent(s); hrs or h is hour(s); mm is millimeter; m is meter; ° C. is degree Celsius; min is minute; g is gram; mmol is millimole; mol is mole; kg is kilogram; L is liter; w/v is weight/volume; µL is microliter; MW is molecular weight.

Coating Test Methods:

Substrate, Coated Test Panel Preparation, Film Weight

Electro tin plate (ETP) substrate panels were supplied by two vendors, Lakeside Metals Inc.—0.23 mm thickness, 2.2 g/m² tin content, temper and annealing type T61CA, and Reynolds Metals Company—0.19 mm thickness, 2.2 g/m² tin content, temper and annealing type DR-8CA. The substrates were coated by casting wet films with wire wound rods, RDS 14 for pigmented and RDS 10 for gold (RDS 14 and RDS 10 available from R.D. Specialties, Inc.). This yielded a final dry film weight) of approximately 14-16 grams/m² for pigmented coatings and approximately 6-8 grams/m² for gold coatings, respectively. The cast panels were placed in a rack to hold them vertically in an oven for cure. A Despatch forced air oven was preheated to a setting temperature of 203° C. The coated panels in a rack were then placed into the oven for 18 minutes of bake cycle time in order to allow the coatings to be baked at 200° C. Peak Metal Temperature (PMT) for 10 minutes. In conclusion of baking cycle, the panel rack was removed from oven and allowed to cool back to ambient conditions. A Sencon SI9600 coating thickness gauge was used to confirm the dry film weight of the applied coatings.

Wedge Bend

A coupon measuring 1.5" wide×4" long was cut from the coated panel. This coupon was tested by a Gardco coverall bend and impact tester following ASTM D 3281. To make a bend test, the coated coupon was first bent over the ⅛" (0.32 cm) steel rod. The bent coupon was placed between the parts of a butt hinge. The hinge made of two steel blocks is attached to the base below the guide tube. When the hinge is closed, it creates a wedge shape gap between the upper and lower parts ranging from ⅛" at the hinged end to zero thickness at the free end. Then the impact tool, flat face down, was dropped from a height of one or two feet onto the upper part of the hinge. Once coated coupon was bent and impacted into a wedge shape, it was then soaked in an acidified copper sulfate solution (5 wt. % copper sulfate, 15 wt. % hydrochloric acid (35%), 80 wt. % distilled water) for 5 minutes to make any coating cracking visible. Excess copper sulfate solution was removed by washing with water and blotting with a dry towel. Wedge bend failure (mm) measured by using a ruler and a lighted magnifying glass is defined as the total length of continuous crack along the bent edge of the coupon. The result is reported as Pass % of wedge bend which is calculated by:

$$\text{Pass \% of wedge bend} = \frac{(\text{Total length} - \text{wedge bend failure})}{\text{Total length}} \times 100\%$$

Each Pass % of wedge bend in this experiment is an average value from 3 replicates.

Methyl Ethyl Ketone (MEK) Double Rubs

The resistance to MEK solvent was measured using a MEK rub test machine (Gardco MEK Rub Test Machine AB-410103EN with 1 kg block). This test was carried out similar to ASTM D7835. MEK solvent resistance was reported as the number of double rubs a coated panel can take before the coating starts to be removed. For example, one back-and-forth motion constitutes one double rub. A maximum of 100 double rubs was set as the upper limit for each evaluation.

Sterilization Resistance Testing

A coated coupon measuring 2.5" wide×4" long was cut from the coated panel. The coupons were then placed in 16 oz wide mouth Le Parfait glass jar half filled with the food simulant where half the coupon is above food simulant liquid and the other half is submerged in food simulant liquid. Two different food simulants were evaluated:

Lactic acid: 2% lactic acid, 98% deionized water.
Acetic Acid: 3% acetic acid, 97% deionized water.

The jars with properly closed top were placed in an autoclave, Priorclave Model PNA/QCS/EH150, for 1 hr at 131° C. Once the retort process was finished, the autoclave was allowed to depressurize to ambient conditions. After the completion of sterilization cycle, the glass jars containing the test coupons were then removed from the autoclave. The coupons were removed from the jars and wash under water and blotted dry with paper towels. Typically, the retort performance is rated on a scale of 0 (worst) to 5 (best) using a visual observation. For each food simulant, the retort performance was rated on (1) blush at vapor phase, (2) blush at liquid phase, (3) rough ness at vapor phase, (4) roughness at liquid phase and (5) cross-hatch adhesion (following ASTM D 3359) at liquid phase, respectively. An overall retort performance is reported as Total Retort % is calculated by:

$$\text{Total Retort \%} = \frac{\text{Sum of rating (1) to (5) from 2\% lactic acid} + \text{Sum of rating (1) to (5) from 3\% acetic acid}}{50} \times 100\%$$

Each retort rating in this experiment is an average rating from 2 replicates.

Crazing Test Rating

A coated coupon measuring 1.0" wide×4.0" long was cut from the coated panel. To make a sample for crazing test, a coated coupon, coating side face out, was uniformly bent over the 12 mm diameter steel rod with 1-2 seconds at 180 degrees. This bending test was carried out similarly to Cylindrical Mandrel Bend Test (ASTM D522). At test, bending was transverse to the grain direction of the substrate and the drawdown direction of the coating (grain direction of the substrate is in parallel to the drawdown direction of the coating). After bending test, the sample was placed under constant temperature and humidity conditions (22.8° C.±2; 50% RH±5) for 24 hours, and followed by crazing evaluation.

When evaluate for Crazing Rating, flashlight was shined on bent area to make any coating cracking or micro-cracking whiten and visible. Any observation of whitening or cracking from bent area was considered as "Fail" in Crazing Rating. Otherwise, it was considered as "Pass". In this experiment, a final "Pass" rating for a sample was the result of consistent "Pass" rating from 2 replicates. Otherwise, the final rating for a sample was considered as "Fail".

Example 1

Synthesis of Modifying Polyester Polyol-Modifying Resin 1 (MR 1)

The polyols were produced using a resin kettle reactor setup controlled with automated control software. The compositions were produced on a 3.5 mole scale using a 2 L kettle with overhead stirring and a partial condenser topped with total condenser and Dean Stark trap. Approximately 10 wt % (based on reaction yield) azeotroping solvent of high boiling point (A150 and A150ND) was used to both encourage egress of the water condensate out of the reaction mixture and keep the reaction mixture viscosity at a reasonable level using the standard paddle stirrer. Isophthalic acid (IPA), adipic acid (AD), 2,2,4,4-tetramethyl-1,3-cyclobutanediol (TMCD), 2-methyl-1,3-propanediol (MPdiol), and Aromatic 150 were added to the reactor which was then completely assembled. The Fascat 4100 (monobutyltin oxide) was added via the sampling port after the reactor had been assembled and blanketed with nitrogen for the reaction. Additional A150/A150ND solvent was added to the Dean Stark trap to maintain the ~10 wt % solvent level in the reaction kettle. The reaction mixture was heated without stirring from room temperature to 150° C. using a set output controlled through the automation system. Once the reaction mixture was fluid enough, the stirring was started to encourage even heating of the mixture. At 150° C., the control of heating was switched to automated control and the temperature was ramped to 230° C. over the course of 4 h. The reaction was held at 230° C. and sampled every 1-2 h upon clearing until the desired acid value was reached (approximately 4 hours). The reaction mixture was then further diluted with A150ND to target a weight percent solid of 55%. This solution was filtered through a ~250 μm paint filter prior to use in the formulation and application testing. It should be noted that the glycol excesses were determined empirically for the lab reactor and may be different depending on the partial condenser and reactor design used. The glycol:acid ratio was also manipulated to enable achieving the same molecular weight with simply different acid and hydroxyl end levels.

| | | Charge | | | |
|---|---|---|---|---|---|
| Raw Material | Moles | Equivalents | Weight | Charge Weight (including excess) | % Excess |
| Stage 1 | | | | | |
| IPA | 2.4500 | 4.9000 | 407.02 | 407.02 | 0 |
| Adipic Acid | 1.0500 | 2.1000 | 153.41 | 153.41 | 0 |
| TMCD | 1.6295 | 3.2591 | 235.00 | 253.79 | 8 |
| MPdiol | 1.9917 | 3.9833 | 179.45 | 183.04 | 2 |
| | | Total Charge | 974.87 | | |
| | | Minus Condensate | 125.05 | | |
| | | Yield | 849.82 | | |

| (Catalyst) | Concentration | |
|---|---|---|
| Fascat 4100 | 400 | 0.70 |
| (Processes Solvent) | Wt. % | |
| A150ND | 10 | 110.88 |
| (Processes Solvent) | Final Wt. % | |
| A150ND | 55 | 603.31 |

Example 2

Synthesis of Modifying Polyester Polyol-Modifying Resin 2 (MR 2)

The polyol was produced using a resin kettle reactor setup controlled with automated control software. The compositions were produced using a 2 L kettle with overhead stirring and a partial condenser topped with total condenser and Dean Stark trap. Approximately 10 wt % (based on reaction yield) azeotroping solvent of high boiling point (A150ND) was used to both encourage egress of the water condensate out of the reaction mixture and keep the reaction mixture viscosity at a reasonable level using the standard paddle stirrer. Isophthalic acid (IPA), adipic acid (AD), 2,2,4,4-tetramethyl-1,3-cyclobutanediol (TMCD), 2-methyl-1,3-propanediol (MPdiol), trimethylolpropane (TMP), and Aromatic 150ND were added to the reactor which was then completely assembled. Fascat 4100 (monobutyltin oxide) catalyst was added via the sampling port after the reactor had been assembled and blanketed with nitrogen for the reaction. Additional A150ND solvent was added to the Dean Stark trap to maintain the ~10 wt % solvent level in the reaction kettle. The reaction mixture was heated without stirring from room temperature to 150° C. using a set output controlled through the automation system. Once the reaction mixture was fluid enough, the stirring was started to encourage even heating of the mixture. At 150° C., the control of heating was switched to automated control and the temperature was ramped to 230° C. over the course of 4 h. The reaction was held at 230° C. and sampled every 1-2 h upon clearing until the desired acid value was reached. The reaction mixture was then further diluted with A150ND to target a weight percent solid of 55%. This solution was filtered through a ~250 μm paint filter prior to use in formulation and application testing. It should be noted that the glycol excesses were determined empirically for the lab reactor and may be different depending on the partial condenser and reactor design used.

| | | Charge | | | |
|---|---|---|---|---|---|
| Raw Material | Moles | Equivalents | Weight | Charge Weight (including excess) | % Excess |
| Stage 1 | | | | | |
| IPA | 2.8455 | 5.6910 | 472.73 | 472.73 | 0 |
| Adipic Acid | 1.2195 | 2.439 | 178.21 | 178.21 | 0 |

-continued

| | | | | | |
|---|---|---|---|---|---|
| TMCD | 1.8039 | 3.6080 | 260.14 | 273.15 | 5 |
| MPdiol | 1.9717 | 3.943 | 177.69 | 179.47 | 1 |
| TMP | 0.4195 | 1.259 | 56.28 | 56.28 | 0 |
| | | Total Charge | 1145.06 | | |
| | | Minus Condensate | 145.06 | | |
| | | Yield | 1000.00 | | |

| Catalyst | Sn Conc. | | |
|---|---|---|---|
| Fascat 4100 | 400 ppm | | 0.70 |

| Process Solvent | Wt. % | | |
|---|---|---|---|
| A150ND | 10 | | 100 |

Example 3

Synthesis of Modifying Polyester Polyol-Modifying Resin 3 (MR 3)

The polyol was produced using a resin kettle reactor setup controlled with automated control software. The compositions were produced using a 2 L kettle with overhead stirring and a partial condenser topped with total condenser and Dean Stark trap. Approximately 10 wt % (based on reaction yield) azeotroping solvent of high boiling point (A150ND) was used to both encourage egress of the water condensate out of the reaction mixture and keep the reaction mixture viscosity at a reasonable level using the standard paddle stirrer. Isophthalic acid (IPA), sebacic acid (SA), 2,2,4,4-tetramethyl-1,3-cyclobutanediol (TMCD), 2-methyl-1,3-propanediol (MPdiol), trimethylolpropane (TMP), and Aromatic 150ND were added to the reactor which was then completely assembled. Fascat 4100 (monobutyltin oxide) catalyst was added via the sampling port after the reactor had been assembled and blanketed with nitrogen for the reaction. Additional A150ND solvent was added to the Dean Stark trap to maintain the ~10 wt % solvent level in the reaction kettle. The reaction mixture was heated without stirring from room temperature to 150° C. using a set output controlled through the automation system. Once the reaction mixture was fluid enough, the stirring was started to encourage even heating of the mixture. At 150° C., the control of heating was switched to automated control and the temperature was ramped to 230° C. over the course of 4 h. The reaction was held at 230° C. and sampled every 1-2 h upon clearing until the desired acid value was reached. The reaction mixture was then further diluted with A150ND to target a weight percent solid of 55%. This solution was filtered through a ~250 μm paint filter prior to use in formulation and application testing. It should be noted that the glycol excesses were determined empirically for the lab reactor and may be different depending on the partial condenser and reactor design used.

| | Charge | | | | |
|---|---|---|---|---|---|
| Raw Material | Moles | Equivalents | Weight | Charge Weight (including excess) | % Excess |
| Stage 1 | | | | | |
| IPA | 2.6699 | 5.3400 | 443.56 | 443.56 | 0 |
| Sebacic Acid | 1.1443 | 2.289 | 231.43 | 231.43 | 0 |
| TMCD | 1.6959 | 3.3920 | 244.56 | 256.79 | 5 |
| MPdiol | 1.9325 | 3.865 | 174.16 | 175.90 | 1 |
| TMP | 0.3155 | 0.947 | 42.33 | 42.33 | 0 |
| | | Total Charge | 1136.03 | | |
| | | Minus Condensate | 136.03 | | |
| | | Yield | 1000.00 | | |

| Catalyst | Sn Conc. | | |
|---|---|---|---|
| Fascat 4100 | 400 ppm | | 0.70 |

| Process Solvent | Wt. % | | |
|---|---|---|---|
| A150ND | 10 | | 100 |

Example 3

Synthesized Modifying Polyester Polyol Compositions and Their Properties

Table 1 lists the compositions of Resins 1 and 2, and Table 2 lists their resin properties.

Glass transition temperature (Tg) was determined using a Q2000 differential scanning calorimeter (DSC) from TA Instruments, New Castle, DE, US, at a scan rate of 20° G/min. Number average molecular weight (Mn) and weight average molecular weight (Mw) Mn were measured by gel permeation chromatography (GPC) using polystyrene equivalent molecular weight. Acid number was measured by using a procedure based on ASTM D7253-1 entitled "Standard Test Method for Polyurethane Raw Materials: Determination of Acidity as Acid Number for Polyether Polyols," and hydroxyl number was measured using a procedure based on ASTM E222-1 entitled "Standard Test Methods for Hydroxyl Groups Using Acetic Anhydride."

TABLE 1

Synthesized Modifying Polyester Polyols

| | Resin Composition as Charged | | | | | | | |
|---|---|---|---|---|---|---|---|---|
| | Mole Ratio Based on Total Hydroxy Components (%) | | | | Mole Ratio Based on Total Acid Components (%) | | | |
| Modifying Resin | TMCD | TCDDM | MPdiol | TMP | TPA | IPA | Sebacic acid | AD |
| MR 1 | | 52 | 40 | 8 | 70 | | 30 | |
| MR 2 | 43 | | 47 | 10 | | 70 | | 30 |
| MR 3 | 43 | | 49 | 8 | | 70 | 30 | |

TABLE 2

Resin Properties of Modifying Polyester Polyols

| Modifying Resin | Tg, °C | Mn | Mw | Acid Number Analyzed | OH Number Analyzed |
|---|---|---|---|---|---|
| MR 1 | 26 | 6600 | 20617 | 3.6 | 45 |
| MR 2 | 35 | 4400 | 37070 | 4.0 | 43 |
| MR 3 | 24 | 7860 | 71869 | 4.4 | 40 |

Example 4

Synthesis of TMCD Polyester (Resin 1)

Using the same method as described in Example 1, a TMCD polyester having the composition listed in Table 3 was prepared. Table 4 lists its resin properties.

TABLE 3

Synthesized TMCD Polyester

| TMCD Polyester | Resin Composition as Charged | | | | | |
|---|---|---|---|---|---|---|
| | Mole Ratio Based on Total Hydroxy Components (%) | | | | Mole Ratio Based on Total Acid Components (%) | |
| | TMCD | 1,4-CHDM | MPdiol | TMP | TPA | IPA |
| Resin 1 | 45 | 43 | 10 | 2 | 30 | 70 |

TABLE 4

Resin Properties of TMCD Polyester

| TMCD Polyester | Tg, °C | Mn | Mw | Acid Number Analyzed | OH Number Analyzed |
|---|---|---|---|---|---|
| Resin 1 | 92 | 10500 | 42000 | 4 | 17 |

Example 4

Preparation of Gold Coating Formulations (GF1-3 and CGF1)

Coating formulations intended for gold color were prepared by using each modifying resin (MR 1-3) and TMCD polyester (Resin 1). The gold formulations (GF 1-3) prepared from each modifying resin and TMCD polyester are listed in Table 5. Also listed in Table 5 is a comparative gold formulation (CGF 1) prepared by using TMCD polyester (Resin 1) without a modifying resin. Table 6 lists the coating properties of said formulations.

Prior to formulating, all polyester polyols were diluted in A150 ND to 50 wt. % solids. The solvent blends were made from the mixture of xylene, butanol and MAK at 30%, 30% and 40% by weight, respectively. An empty glass jar with a lid was labeled and pre-weighted to record the tare weight. For each formulation, Curaphen 40-856-B60, Desmodur® BL 2078/2, Nacure® XC-296B and the solvent blend were weighed out respectively and added to the resin solution in order. The formulation was then sheared for 10-15 minutes at 1500 RPMs with a Cowles blade on a Dispermat™ high speed disperser. Once it was completed, the glass jar containing the formulation was then rolled overnight with slight agitation at ambient conditions.

A food grade approved Desmodur® BL 2078/2 available from Covestro AG and Curaphen 40-856-B60 available from Bitrez were chosen as blocked IPDI trimer and m-cresol phenolic-formaldehyde resin crosslinkers, respectively. A food grade approved Nacure® XC-296B available from King Industrials was chosen as $H_3PO_4$ catalyst.

TABLE 5

Gold Coating Formulations Based on Modifying Resins and TMCD Polyester

| Component | Solids/Active % | GF 1 Weight (g) | GF 2 Weight (g) | GF 3 Weight (g) | CGF-1 Weight (g) |
|---|---|---|---|---|---|
| MR1 (modifying resin) | 50% | 29.25 | | | |
| MR2 (modifying resin) | 50% | | 29.25 | | |
| MR3 (modifying resin) | 50% | | | 29.25 | |
| Resin 1 (TMCD Polyester) | 50% | 29.25 | 29.25 | 29.25 | 58.50 |
| Curaphen 40-856-B60 | 60% | 18.75 | 18.75 | 18.75 | 18.75 |
| Desmodur ® BL 2078/2 | 60% | 7.50 | 7.50 | 7.50 | 7.50 |
| Nacure ® XC-296B | 28% | 1.80 | 1.80 | 1.80 | 1.80 |
| BYK ® - 1790 | 100% | 0.26 | 0.26 | 0.26 | 0.26 |
| Solvent Blend (Xylene, Butanol, MAK 30/30/40) | 0% | 13.19 | 13.19 | 13.19 | 13.19 |
| Total | | 100.00 | 100.00 | 100.00 | 100.00 |
| Calculation: | | | | | |
| % Modifying Resin on total polyesters | | 50.00% | 50.00% | 50.00% | 0.00% |
| % Total solids | | 45.00% | 45.00% | 45.00% | 45.00% |
| % Polyester polyol on total binder | | 65.00% | 65.00% | 65.00% | 65.00% |
| % IPDI on total binder | | 10.00% | 10.00% | 10.00% | 10.00% |
| % Phenolic on total binder | | 25.00% | 25.00% | 25.00% | 25.00% |
| % $H_3PO_4$ catalyst on total solids | | 4.00% | 4.00% | 4.00% | 4.00% |

TABLE 6

Gold Coating Properties

| Examples | MEK double Rubs | Pass % of wedge bend | Crazing rating | Total Retort % |
|---|---|---|---|---|
| GF 1 | 100+ | 79% | Pass | 65% |
| GF 2 | 100+ | 69% | Pass | 78% |
| GF 3 | 100+ | 72% | Pass | 77% |
| CGF-1 | 100+ | 60% | Fail | 97% |

Example 5

Preparation of Gold Coating Formulations (GF 2-5 and CGF 2-3)

Coating formulations intended for gold color were prepared by using the modifying resins, MR 2 and MR 3, and the TMCD polyester, Resin 1. Three formulations, GF2, CGF2, and CGF3, were prepared by using MR 2 and Resin 1 at ratios of 50/50, 65/35, and 75/25. CGF2 and CGF3 are labeled as comparative gold formulations since they failed both MEK double rubs and Total Retort tests. Separately, another three formulations, GF3, GF4, and GF5 were prepared by using MR 3 and Resin 1 at ratios of 50/50, 35/65, and 20/80. The compositions of the formulations are listed in Table 7, and the coating properties are listed in Table 8.

TABLE 7

Gold Coating Formulations Based on Modifying Resins and TMCD Polyester at various ratios

| Component | Solids/Active % | GF 2 Weight (g) | CGF-2 Weight (g) | CGF-3 Weight (g) | GF 3 Weight (g) | GF 4 Weight (g) | GF 5 Weight (g) |
|---|---|---|---|---|---|---|---|
| Resin 1 (TMCD Polyester) | 50% | 29.25 | 20.48 | 14.63 | 29.25 | 38.02 | 46.80 |
| MR 2 (modifying resin) | 50% | 29.25 | 38.02 | 43.87 | | | |
| MR 3 (modifying resin) | 50% | | | | 29.25 | 20.48 | 11.70 |
| Curaphen 40-856-B60 | 60% | 18.75 | 18.75 | 18.75 | 18.75 | 18.75 | 18.75 |
| Desmodur ® BL 2078/2 | 60% | 7.50 | 7.50 | 7.50 | 7.50 | 7.50 | 7.50 |
| Nacure ® XC-296B | 28% | 1.80 | 1.80 | 1.80 | 1.80 | 1.80 | 1.80 |
| BYK ® - 1790 | 100% | 0.26 | 0.26 | 0.26 | 0.26 | 0.26 | 0.26 |
| Solvent Blend (Xylene, Butanol, MAK 30/30/40) | 0% | 13.19 | 13.19 | 13.19 | 13.19 | 13.19 | 13.19 |
| Total | | 100.00 | 100.00 | 100.00 | 100.00 | 100.00 | 100.00 |
| Calculation: | | | | | | | |
| % Modifying Resin on total polyesters | | 50.00% | 65.00% | 75.00% | 50% | 35.00% | 20.00% |
| % Total solids | | 45.00% | 45.00% | 45.00% | 45.00% | 45.00% | 45.00% |
| % Polyester polyol on total binder | | 65.00% | 65.00% | 65.00% | 65.00% | 65.00% | 65.00% |
| % IPDI on total binder | | 10.00% | 10.00% | 10.00% | 10.00% | 10.00% | 10.00% |
| % Phenolic on total binder | | 25.00% | 25.00% | 25.00% | 25.00% | 25.00% | 25.00% |
| % $H_3PO_4$ catalyst on total solids | | 4.00% | 4.00% | 4.00% | 4.00% | 4.00% | 4.00% |

TABLE 8

Gold Coating Properties

| Examples | MEK double Rubs | Pass % of wedge bend | Crazing rating | Total Retort % |
|---|---|---|---|---|
| GF 2 | 100+ | 69% | Pass | 78% |
| CGF-2 | 58 | 73% | Pass | 52% |
| CGF-3 | 35 | 83% | Pass | 34% |
| GF 3 | 100+ | 72% | Pass | 77% |
| GF 4 | 100+ | 73% | Pass | 74% |
| GF 5 | 100+ | 73% | Pass | 76% |

Comparative Example 1

Synthesis of Comparative Modifying Polyester Polyol-Comparative Modifying Resin (CMR-1)

This example describes the synthesis of a polyester polyol having low TMP (2 mole %) and low OH number (25 mgKOH/g) as compared to the inventive modifying polyester polyol.

The polyol was produced using a resin kettle reactor setup controlled with automated control software. The compositions were produced using a 2 L kettle with overhead stirring and a partial condenser topped with total condenser and Dean Stark trap. Approximately 10 wt % (based on reaction yield) azeotroping solvent of high boiling point (A150ND) was used to both encourage egress of the water condensate out of the reaction mixture and keep the reaction mixture viscosity at a reasonable level using the standard paddle stirrer. Isophthalic acid (IPA), adipic acid (AD), 2,2,4,4-tetramethyl-1,3-cyclobutanediol (TMCD), 2-methyl-1,3-propanediol (MPdiol), trimethylolpropane (TMP), and Aromatic 150ND were added to the reactor which was then completely assembled. Fascat 4100 (monobutyltin oxide) catalyst was added via the sampling port after the reactor had been assembled and blanketed with nitrogen for the reaction.

Additional A150ND solvent was added to the Dean Stark trap to maintain the ~10 wt % solvent level in the reaction kettle. The reaction mixture was heated without stirring from room temperature to 150° C. using a set output controlled through the automation system. Once the reaction mixture was fluid enough, the stirring was started to encourage even heating of the mixture. At 150° C., the control of heating was switched to automated control and the temperature was ramped to 230° C. over the course of 4 h. The reaction was held at 230° C. and sampled every 1-2 h upon clearing until the desired acid value was reached. The reaction mixture was then further diluted with A150ND to target a weight percent solid of 55%. This solution was filtered through a ~250 μm paint filter prior to use in formulation and application testing. It should be noted that the glycol excesses were determined empirically for the lab reactor and may be different depending on the partial condenser and reactor design used.

| Raw Material | Moles | Equivalents | Weight | Charge Weight (including excess) | % Excess |
|---|---|---|---|---|---|
| Charge | | | | | |
| Stage 1 | | | | | |
| IPA | 2.4500 | 4.9000 | 407.02 | 407.02 | 0 |
| Adipic Acid | 1.0500 | 2.1000 | 153.41 | 153.41 | 0 |
| MPdiol | 1.9002 | 3.8003 | 171.20 | 172.92 | 1 |
| TMCD | 1.6133 | 3.2267 | 232.66 | 253.60 | 9 |
| TMP | 0.0717 | 0.2151 | 9.62 | 7.50 | −22 |
| | | Total Charge Minus Condensate | 973.91 125.05 | | |
| | | Yield | 848.86 | | |

| (Catalyst) | Concentration | | |
|---|---|---|---|
| Fascat 4100 | 400 | | 0.70 |

| (Process Solvent) | Wt. % | | |
|---|---|---|---|
| A150ND | 10 | | 110.57 |

| (Dilution Solvent) | Final Wt. % | | |
|---|---|---|---|
| A150ND | 55 | | 601.32 |

Comparative Example 2

Synthesis of Comparative Modifying Polyester Polyol (CMR-2)

This example describes the synthesis of a polyester polyol having low TMCD (22 mole %) and no MPdiol as compared to the inventive modifying polyester polyol.

The polyol was produced using a resin kettle reactor setup controlled with automated control software. The compositions were produced using a 2 L kettle with overhead stirring and a partial condenser topped with total condenser and Dean Stark trap. Approximately 10 wt % (based on reaction yield) azeotroping solvent of high boiling point (A150ND) was used to both encourage egress of the water condensate out of the reaction mixture and keep the reaction mixture viscosity at a reasonable level using the standard paddle stirrer. Isophthalic acid (IPA), purified terephthalic acid (TPA), adipic acid (AD), 2,2,4,4-tetramethyl-1,3-cyclobutanediol (TMCD), 2,2-dimethyl-1,3-propanediol (NPG Glycol), trimethylolpropane (TMP), and Aromatic 150ND were added to the reactor which was then completely assembled. Fascat 4100 (monobutyltin oxide) catalyst was added via the sampling port after the reactor had been assembled and blanketed with nitrogen for the reaction. Additional A150ND solvent was added to the Dean Stark trap to maintain the ~10 wt % solvent level in the reaction kettle. The reaction mixture was heated without stirring from room temperature to 150° C. using a set output controlled through the automation system. Once the reaction mixture was fluid enough, the stirring was started to encourage even heating of the mixture. At 150° C., the control of heating was switched to automated control and the temperature was ramped to 230° C. over the course of 4 h. The reaction was held at 230° C. and sampled every 1-2 h upon clearing until the desired acid value was reached. The reaction mixture was then further diluted with A150ND to target a weight percent solid of 55%. This solution was filtered through a ~250 μm paint filter prior to use in formulation and application testing. It should be noted that the glycol excesses were determined empirically for the lab reactor and may be different depending on the partial condenser and reactor design used.

| Raw Material | Moles | Equivalents | Weight | Charge Weight (including excess) | % Excess |
|---|---|---|---|---|---|
| Charge | | | | | |
| Stage 1 | | | | | |
| IPA | 1.5415 | 3.0830 | 256.09 | 256.09 | 0 |
| TPA | 0.9582 | 1.917 | 159.19 | 159.19 | |
| Adipic Acid | 1.6665 | 3.333 | 243.52 | 243.52 | 0 |
| TMCD | 0.9441 | 1.8880 | 136.14 | 142.95 | 5 |
| NPG Glycol | 3.1755 | 6.351 | 330.73 | 334.03 | 1 |
| TMP | 0.1716 | 0.515 | 23.03 | 23.03 | 0 |
| | | Total Charge Minus Condensate | 1148.70 148.70 | | |
| | | Yield | 1000.00 | | |

| Catalyst | Sn Conc. | | |
|---|---|---|---|
| Fascat 4100 | 400 ppm | | 0.70 |

| Process Solvent | Wt. % | | |
|---|---|---|---|
| A150ND | 10 | | 100 |

Comparative Example 3

Synthesis of Comparative Modifying Polyester Polyol (CMR-3) (Resin 17, EX4940-014)

This example describes the synthesis of a polyester polyol having low TMCD (22 mole %) and no MPdiol as compared to the inventive modifying polyester polyol.

The polyol was produced using a resin kettle reactor setup controlled with automated control software. The compositions were produced using a 2 L kettle with overhead stirring and a partial condenser topped with total condenser and Dean Stark trap. Approximately 10 wt % (based on reaction yield) azeotroping solvent of high boiling point (A150ND)

was used to both encourage egress of the water condensate out of the reaction mixture and keep the reaction mixture viscosity at a reasonable level using the standard paddle stirrer. Isophthalic acid (IPA), terephthalic acid (TPA), sebacic acid (SA), 2,2,4,4-tetramethyl-1,3-cyclobutanediol (TMCD), 2,2-dimethyl-1,3-propanediol (NPG Glycol), trimethylolpropane (TMP), and Aromatic 150ND were added to the reactor which was then completely assembled. Fascat 4100 (monobutyltin oxide) catalyst was added via the sampling port after the reactor had been assembled and blanketed with nitrogen for the reaction. Additional A150ND solvent was added to the Dean Stark trap to maintain the ~10 wt % solvent level in the reaction kettle. The reaction mixture was heated without stirring from room temperature to 150° C. using a set output controlled through the automation system. Once the reaction mixture was fluid enough, the stirring was started to encourage even heating of the mixture. At 150° C., the control of heating was switched to automated control and the temperature was ramped to 230° C. over the course of 4 h. The reaction was held at 230° C. and sampled every 1-2 h upon clearing until the desired acid value was reached. The reaction mixture was then further diluted with A150ND to target a weight percent solid of 55%. This solution was filtered through a ~250 μm paint filter prior to use in formulation and application testing. It should be noted that the glycol excesses were determined empirically for the lab reactor and may be different depending on the partial condenser and reactor design used.

| Charge | | | | | |
|---|---|---|---|---|---|
| Raw Material | Moles | Equivalents | Weight | Charge Weight (including excess) | % Excess |
| Stage 1 | | | | | |
| IPA | 1.6595 | 3.3190 | 275.69 | 275.69 | 0 |
| TPA | 1.042 | 2.084 | 173.11 | 173.11 | |
| Sebacic Acid | 1.1578 | 2.316 | 234.16 | 234.16 | 0 |
| TMCD | 0.8762 | 1.7520 | 126.36 | 132.68 | 5 |
| NPG Glycol | 2.9473 | 5.895 | 306.96 | 310.03 | 1 |
| TMP | 0.1593 | 0.478 | 21.37 | 21.37 | 0 |
| | | Total Charge | 1137.66 | | |
| | | Minus Condensate | 137.66 | | |
| | | Yield | 1000.00 | | |
| Catalyst | Sn Conc. | | | | |
| Fascat 4100 | 400 ppm | | | 0.70 | |
| Process Solvent | Wt. % | | | | |
| A150ND | 10 | | | 100 | |

Comparative Example 4

Synthesis of Comparative Modifying Polyester Polyol (CMR-4)

This example describes the synthesis of a polyester polyol having low TMP (2 mole %), low OH number (16 mgKOH/g), and high Tg (90° C.) as compared to the inventive modifying polyester polyol.

The polyol was produced using a resin kettle reactor setup controlled with automated control software. The compositions were produced using a 2 L kettle with overhead stirring and a partial condenser topped with total condenser and Dean Stark trap. Approximately 10 wt % (based on reaction yield) azeotroping solvent of high boiling point (A150ND) was used to both encourage egress of the water condensate out of the reaction mixture and keep the reaction mixture viscosity at a reasonable level using the standard paddle stirrer. Isophthalic acid (IPA), terephthalic acid (TPA), 1,4-cyclohexanedicarboxylic acid (1,4-CHDA), 2,2,4,4-tetramethyl-1,3-cyclobutanediol (TMCD), 1,4-cyclohexanedimethanol (CHDM), trimethylolpropane (TMP), and Aromatic 150ND were added to the reactor which was then completely assembled. Fascat 4100 (monobutyltin oxide) catalyst was added via the sampling port after the reactor had been assembled and blanketed with nitrogen for the reaction. Additional A150ND solvent was added to the Dean Stark trap to maintain the ~10 wt % solvent level in the reaction kettle. The reaction mixture was heated without stirring from room temperature to 150° C. using a set output controlled through the automation system. Once the reaction mixture was fluid enough, the stirring was started to encourage even heating of the mixture. At 150° C., the control of heating was switched to automated control and the temperature was ramped to 230° C. over the course of 4 h. The reaction was held at 230° C. and sampled every 1-2 h upon clearing until the desired acid value was reached. The reaction mixture was then further diluted with A150ND to target a weight percent solid of 55%. This solution was filtered through a ~250 μm paint filter prior to use in formulation and application testing. It should be noted that the glycol excesses were determined empirically for the lab reactor and may be different depending on the partial condenser and reactor design used.

| Charge | | | | | |
|---|---|---|---|---|---|
| Raw Material | Moles | Equivalents | Weight | Charge Weight (including excess) | % Excess |
| Stage 1 | | | | | |
| IPA | 1.7500 | 3.5000 | 290.73 | 290.73 | 0 |
| TPA | 0.7000 | 1.4000 | 116.29 | 116.29 | 0 |
| CHDA | 1.0500 | 2.1000 | 180.81 | 180.81 | 0 |
| TMCD | 1.7910 | 3.5820 | 258.28 | 278.94 | 8 |
| 1,4-CHDM | 1.7193 | 3.4387 | 247.95 | 250.43 | 1 |
| TMP | 0.0716 | 0.2149 | 9.61 | 10.09 | 5 |
| | | Total Charge | 1103.66 | | |
| | | Minus Condensate | 124.72 | | |
| | | Yield | 978.94 | | |
| (Catalyst) | Concentration | | | | |
| Fascat 4100 | 400 | | | 0.79 | |
| (Process Solvent) | Wt. % | | | | |
| A150ND | 10 | | | 125.34 | |
| (Dilution Solvent) | Final Wt. % | | | | |
| A150ND | 55 | | | 695.59 | |

Comparative Example 5

Synthesis of Comparative Modifying Polyester Polyol (CMR-5)

This example describes the synthesis of a polyester polyol having low TMCD (22 mole %), no MPdiol, and no IPA or TPA, as compared to the inventive modifying polyester polyol.

The polyol was produced using a resin kettle reactor setup controlled with automated control software. The compositions were produced using a 2 L kettle with overhead stirring and a partial condenser topped with total condenser and Dean Stark trap. Approximately 10 wt % (based on reaction yield) azeotroping solvent of high boiling point (A150ND) was used to both encourage egress of the water condensate out of the reaction mixture and keep the reaction mixture viscosity at a reasonable level using the standard paddle stirrer. 1,4-cyclohexanedi-carboxylic acid (1,4-CHDA), 2,2,4,4-tetramethyl-1,3-cyclobutanediol (TMCD), 2,2-dimethyl-1,3-propanediol (NPG Glycol), trimethylolpropane (TMP), and Aromatic 150ND were added to the reactor which was then completely assembled. Fascat 4100 (monobutyltin oxide) catalyst was added via the sampling port after the reactor had been assembled and blanketed with nitrogen for the reaction. Additional A150ND solvent was added to the Dean Stark trap to maintain the ~10 wt % solvent level in the reaction kettle. The reaction mixture was heated without stirring from room temperature to 150° C. using a set output controlled through the automation system. Once the reaction mixture was fluid enough, the stirring was started to encourage even heating of the mixture. At 150° C., the control of heating was switched to automated control and the temperature was ramped to 230° C. over the course of 4 h. The reaction was held at 230° C. and sampled every 1-2 h upon clearing until the desired acid value was reached. The reaction mixture was then further diluted with A150ND to target a weight percent solid of 55%. This solution was filtered through a ~250 μm paint filter prior to use in formulation and application testing. It should be noted that the glycol excesses were determined empirically for the lab reactor and may be different depending on the partial condenser and reactor design used.

| Charge | | | | | |
|---|---|---|---|---|---|
| Raw Material | Moles | Equivalents | Weight | Charge Weight (including excess) | % Excess |
| Stage 1 | | | | | |
| 1,4-CHDA | 3.9322 | 7.864 | 677.00 | 677.00 | 0 |
| TMCD | 0.8928 | 1.7860 | 128.75 | 135.18 | 5 |
| NPG Glycol | 3.0029 | 6.006 | 312.75 | 315.88 | 1 |
| TMP | 0.1623 | 0.487 | 21.77 | 21.77 | 0 |
| | | Total Charge | 1140.27 | | |
| | | Minus Condensate | 140.27 | | |
| | | Yield | 1000.00 | | |

| Charge | | | |
|---|---|---|---|
| Catalyst | Sn Conc. | | |
| Fascat 4100 | 400 ppm | | 0.70 |
| Process Solvent | Wt. % | | |
| A150ND | 10 | | 100 |

Comparative Example 6

Synthesis of Comparative Modifying Polyester Polyol (CMR-6)

This example describes the synthesis of a polyester polyol having low TMCD (24 mole %), no MPdiol, no TMP, and low OH number (24 mgKOH/g) as compared to the inventive modifying polyester polyol.

The polyol was produced using a resin kettle reactor setup controlled with automated control software. The compositions were produced using a 2 L kettle with overhead stirring and a partial condenser topped with total condenser and Dean Stark trap. Approximately 10 wt % (based on reaction yield) azeotroping solvent of high boiling point (A150ND) was used to both encourage egress of the water condensate out of the reaction mixture and keep the reaction mixture viscosity at a reasonable level using the standard paddle stirrer. Isophthalic acid (IPA), terephthalic acid (TPA), adipic acid (AD), 2,2,4,4-tetramethyl-1,3-cyclobutanediol (TMCD), 2,2-dimethyl-1,3-propanediol (NPG Glycol), trimethylolpropane (TMP), and Aromatic 150ND were added to the reactor which was then completely assembled. Fascat 4100 (monobutyltin oxide) catalyst was added via the sampling port after the reactor had been assembled and blanketed with nitrogen for the reaction. Additional A150ND solvent was added to the Dean Stark trap to maintain the ~10 wt % solvent level in the reaction kettle. The reaction mixture was heated without stirring from room temperature to 150° C. using a set output controlled through the automation system. Once the reaction mixture was fluid enough, the stirring was started to encourage even heating of the mixture. At 150° C., the control of heating was switched to automated control and the temperature was ramped to 230° C. over the course of 4 h. The reaction was held at 230° C. and sampled every 1-2 h upon clearing until the desired acid value was reached. The reaction mixture was then further diluted with A150ND to target a weight percent solid of 55%. This solution was filtered through a ~250 μm paint filter prior to use in formulation and application testing. It should be noted that the glycol excesses were determined empirically for the lab reactor and may be different depending on the partial condenser and reactor design used.

| Charge | | | | | |
|---|---|---|---|---|---|
| Raw Material | Moles | Equivalents | Weight | Charge Weight (including excess) | % Excess |
| Stage 1 | | | | | |
| IPA | 1.7733 | 3.5470 | 294.60 | 294.60 | 0 |
| TPA | 1.1135 | 2.227 | 184.98 | 184.98 | |

-continued

| Charge | | | | | |
|---|---|---|---|---|---|
| Adipic Acid | 1.2372 | 2.474 | 180.79 | 180.79 | 0 |
| TMCD | 1.0283 | 2.0570 | 148.30 | 155.71 | 5 |
| NPG Glycol | 3.2564 | 6.513 | 339.16 | 342.55 | 1 |
| | | Total Charge | 1147.82 | | |
| | | Minus Condensate | 147.82 | | |
| | | Yield | 1000.00 | | |

| Catalyst | Sn Conc. | |
|---|---|---|
| Fascat 4100 | 400 ppm | 0.70 |

| Process Solvent | Wt. % | |
|---|---|---|
| A150ND | 10 | 100 |

Comparative Example 7

Synthesis of Comparative Modifying Polyester Polyol (CMR-7)

This example describes the synthesis of a polyester polyol having low TMCD (24 mole %), no MPdiol, no TMP, and low OH number (23 mgKOH/g) as compared to the inventive modifying polyester polyol.

The polyol was produced using a resin kettle reactor setup controlled with automated control software. The compositions were produced using a 2 L kettle with overhead stirring and a partial condenser topped with total condenser and Dean Stark trap. Approximately 10 wt % (based on reaction yield) azeotroping solvent of high boiling point (A150ND) was used to both encourage egress of the water condensate out of the reaction mixture and keep the reaction mixture viscosity at a reasonable level using the standard paddle stirrer. Isophthalic acid (IPA), terephthalic acid (TPA), sebacic acid (SA), 2,2,4,4-tetramethyl-1,3-cyclobutanediol (TMCD), 2,2-dimethyl-1,3-propanediol (NPG Glycol), trimethylolpropane (TMP), and Aromatic 150ND were added to the reactor which was then completely assembled. Fascat 4100 (monobutyltin oxide) catalyst was added via the sampling port after the reactor had been assembled and blanketed with nitrogen for the reaction. Additional A150ND solvent was added to the Dean Stark trap to maintain the ~10 wt % solvent level in the reaction kettle. The reaction mixture was heated without stirring from room temperature to 150° C. using a set output controlled through the automation system. Once the reaction mixture was fluid enough, the stirring was started to encourage even heating of the mixture. At 150° C., the control of heating was switched to automated control and the temperature was ramped to 230° C. over the course of 4 h. The reaction was held at 230° C. and sampled every 1-2 h upon clearing until the desired acid value was reached. The reaction mixture was then further diluted with A150ND to target a weight percent solid of 55%. This solution was filtered through a ~250 μm paint filter prior to use in formulation and application testing. It should be noted that the glycol excesses were determined empirically for the lab reactor and may be different depending on the partial condenser and reactor design used.

| Charge | | | | | |
|---|---|---|---|---|---|
| Raw Material | Moles | Equivalents | Weight | Charge Weight (including excess) | % Excess |
| Stage 1 | | | | | |
| IPA | 1.6559 | 3.3120 | 275.10 | 275.10 | 0 |
| TPA | 1.0398 | 2.08 | 172.74 | 172.74 | |
| Sebacic Acid | 1.1553 | 2.311 | 233.66 | 233.66 | 0 |
| TMCD | 0.9630 | 1.9260 | 138.88 | 145.83 | 5 |
| NPG Glycol | 3.0497 | 6.099 | 317.62 | 320.80 | 1 |
| | | Total Charge | 1137.99 | | |
| | | Minus Condensate | 137.99 | | |
| | | Yield | 1000.00 | | |

| Catalyst | Sn Conc. | |
|---|---|---|
| Fascat 4100 | 400 ppm | 0.70 |

| Process Solvent | Wt. % | |
|---|---|---|
| A150ND | 10 | 100 |

Comparative Example 8

Synthesis of Comparative Modifying Polyester Polyol (CMR-8)

This example describes the synthesis of a polyester polyol having high TCDDM (72 mole %) but within the Tg range as compared to the inventive modifying polyester polyol.

The polyols were produced using a resin kettle reactor setup controlled with automated control software. The compositions were produced on a 3.5 mole scale using a 2 L kettle with overhead stirring and a partial condenser topped with total condenser and Dean Stark trap. Approximately 10 wt % (based on reaction yield) azeotroping solvent of high boiling point (A150 and A150ND) was used to both encourage egress of the water condensate out of the reaction mixture and keep the reaction mixture viscosity at a reasonable level using the standard paddle stirrer. Terephthalic acid (TPA), sebacic acid (SA), 4,8-bis(hydroxymethyl)tricyclo[5.2.1.0$^{2,6}$]decane, mixture of isomers (TCDDM), 2-methyl-1,3-propanediol (MPdiol), trimethylolpropane (TMP), and Aromatic 150 were added to the reactor which was then completely assembled. The Fascat 4100 (monobutyltin oxide) was added via the sampling port after the reactor had been assembled and blanketed with nitrogen for the reaction. Additional A150/A150ND solvent was added to the Dean Stark trap to maintain the ~10 wt % solvent level in the reaction kettle. The reaction mixture was heated without stirring from room temperature to 150° C. using a set output controlled through the automation system. Once the reaction mixture was fluid enough, the stirring was started to encourage even heating of the mixture. At 150° C., the control of heating was switched to automated control and the temperature was ramped to 230° C. over the course of 4 h. The reaction was held at 230° C. and sampled every 1-2 h upon clearing until the desired acid value was reached (approximately 3 hours). The reaction mixture was then further diluted with A150ND to target a weight percent solid of 55%. This solution was filtered through a ~250 μm paint filter prior to use in the formulation and application testing. It should be noted that the glycol excesses were determined empirically for the lab reactor and may be different depending on the partial condenser and reactor design used. The glycol:acid ratio was also manipulated to enable achieving the same molecular weight with simply different acid and hydroxyl end levels.

| Charge | | | | | |
|---|---|---|---|---|---|
| Raw Material | Moles | Equivalents | Weight | Charge Weight (including excess) | % Excess |
| Stage 1 | | | | | |
| TPA | 2.4500 | 4.9000 | 407.02 | 407.02 | 0 |
| Sebacic Acid | 1.0500 | 2.1000 | 212.42 | 212.42 | 0 |
| TCDDM | 2.7065 | 5.4131 | 531.27 | 557.83 | 5 |
| MPdiol | 0.7518 | 1.5036 | 67.74 | 68.42 | 1 |
| TMP | 0.3007 | 0.9022 | 40.35 | 40.75 | 1 |
|  |  | Total Charge | 1258.79 |  |  |
|  |  | Minus Condensate |  | 124.50 |  |
|  |  | Yield | 1134.28 |  |  |

| (Catalyst) | Concentration | | |
|---|---|---|---|
| Fascat 4100 | 400 |  | 0.91 |
| (Processes Solvent) | Wt. % | | |
| A150ND | 10 |  | 143.04 |
| (Processes Solvent) | Final Wt. % | | |
| A150ND | 55 |  | 808.37 |

Comparative Example 9

Synthesized Comparative Modifying Polyester Polyols (CMR1-8)

The compositions of the comparative modifying polyester polyols are listed in Table 9; Table 10 lists their resin properties.

TABLE 9

Synthesized Comparative Modifying Polyester Polyols

Resin Composition as Charged

| | Mole Ratio Based on Total Hydroxy Components (%) | | | | | | Mole Ratio Based on Total Acid Components (%) | | | |
|---|---|---|---|---|---|---|---|---|---|---|
| | TMCD | TCDDM | CHDM | MPdiol | NFG | TMP | TPA | IPA | AD | Sebacic acid | CHDA |
| CMR1 | 45 |  | 53 |  |  | 2 | 70 | 30 |  |  |  |
| CMR2 | 22 |  |  | 74 |  | 4 | 23 | 37 | 40 |  |  |
| CMR3 | 22 |  |  | 74 |  | 4 | 27 | 43 |  | 30 |  |
| CMR4 | 50 | 48 |  |  |  | 2 | 20 | 50 |  |  | 30 |
| CMR5 | 22 |  |  | 74 |  | 4 |  |  |  | 100 |  |
| CMR6 | 24 |  |  | 76 |  |  | 27 | 43 | 30 |  |  |
| CMR7 | 24 |  |  | 76 |  |  | 27 | 43 |  | 30 |  |
| CMR8 |  | 72 |  | 20 |  | 8 | 70 |  |  | 30 |  |

TABLE 10

Resin Properties of Comparative Modifying Polyester Polyols

| Comparative Modifying Resin | Tg, ° C. | Mn | Mw | Acid Number Analyzed | OH Number Analyzed |
|---|---|---|---|---|---|
| CMR1 | 32 | 7122 | 17137 | 4.3 | 25 |
| CMR2 | 22 | 8405 | 27879 | 3.7 | 37 |
| CMR3 | 22 | 8133 | 27177 | 4.0 | 31 |
| CMR4 | 90 | 10650 | 27181 | 4.0 | 16 |
| CMR5 | 28 | 13512 | 42838 | 3.7 | 37 |
| CMR6 | 31 | 7896 | 16031 | 3.0 | 24 |
| CMR7 | 22 | 9424 | 20765 | 2.9 | 23 |
| CMR8 | 34 | 6442 | 17656 | 2.3 | 49 |

Comparative Example 10

Preparation of Comparative Gold Coating Formulations (CGF 2-9)

Coating formulations intended for gold color were prepared by using each comparative modifying resin (CMR 1-8) and TMCD polyester (Resin 1). The comparative gold formulations (CGF 2-9) prepared from each comparative modifying resin and TMCD polyester are listed in Table 11. Table 12 lists the coating properties of said formulations.

Prior to formulating, all polyester polyols were diluted in A150 ND to 50 wt. % solids. The solvent blends were made from the mixture of xylene, butanol and MAK at 30%, 30% and 40% by weight, respectively. An empty glass jar with a lid was labeled and pre-weighted to record the tare weight. For each formulation, Curaphen 40-856-B60, Desmodur® BL 2078/2, Nacure® XC-296B and the solvent blend were weighed out respectively and added to the resin solution in order. The formulation was then sheared for 10-15 minutes at 1500 RPMs with a Cowles blade on a Dispermat™ high speed disperser. Once it was completed, the glass jar containing the formulation was then rolled overnight with slight agitation at ambient conditions.

A food grade approved Desmodur® BL 2078/2 available from Covestro AG and Curaphen 40-856-B60 available from Bitrez were chosen as blocked IPDI trimer and m-cresol phenolic-formaldehyde resin crosslinkers, respectively. A food grade approved Nacure® XC-296B available from King Industrials was chosen as $H_3PO_4$ catalyst.

TABLE 11

Gold Coating Formulations Based on Comparative Modifying Resins and TMCD Polyester

| Component | Solids/ Active % | CGF-4 Weight (g) | CGF-5 Weight (g) | CGF-6 Weight (g) | CGF-7 Weight (g) | CGF-8 Weight (g) | CGF-9 Weight (g) | CGF-10 Weight (g) | CGF-11 Weight (g) |
|---|---|---|---|---|---|---|---|---|---|
| CMR 1 | 50% | 29.25 | | | | | | | |
| CMR 2 | 50% | | 29.25 | | | | | | |
| CMR 3 | 50% | | | 29.25 | | | | | |
| CMR 4 | 50% | | | | 29.25 | | | | |
| CMR 5 | 50% | | | | | 29.25 | | | |
| CMR 6 | 50% | | | | | | 29.25 | | |
| CMR 7 | 50% | | | | | | | 29.25 | |
| CMR 8 | 50% | | | | | | | | 29.25 |
| Resin 1 (TMCD Polyester) | 50% | 29.25 | 29.25 | 29.25 | 29.25 | 29.25 | 29.25 | 29.25 | 29.25 |
| Curaphen 40-856-B60 | 60% | 18.75 | 18.75 | 18.75 | 18.75 | 18.75 | 18.75 | 18.75 | 18.75 |
| Desmodur ® BL 2078/2 | 60% | 7.50 | 7.50 | 7.50 | 7.50 | 7.50 | 7.50 | 7.50 | 7.50 |
| Nacure ® XC-296B | 28% | 1.80 | 1.80 | 1.80 | 1.80 | 1.80 | 1.80 | 1.80 | 1.80 |
| BYK ® - 1790 | 100% | 0.26 | 0.26 | 0.26 | 0.26 | 0.26 | 0.26 | 0.26 | 0.26 |
| Solvent Blend (Xylene, Butanol, MAK 30/30/40) | 0% | 13.19 | 13.19 | 13.19 | 13.19 | 13.19 | 13.19 | 13.19 | 13.19 |
| Total | | 100.00 | 100.00 | 100.00 | 100.00 | 100.00 | 100.00 | 100.00 | 100.00 |
| Calculation: | | | | | | | | | |
| % Modifying Resin on total polyesters | | 50.00% | 50.00% | 50.00% | 50.00% | 50.00% | 50.00% | 50.00% | 50.00% |
| % Total solids | | 45.00% | 45.00% | 45.00% | 45.00% | 45.00% | 45.00% | 45.00% | 45.00% |
| % Polyester polyol on total binder | | 65.00% | 65.00% | 65.00% | 65.00% | 65.00% | 65.00% | 65.00% | 65.00% |
| % IPDI on total binder | | 10.00% | 10.00% | 10.00% | 10.00% | 10.00% | 10.00% | 10.00% | 10.00% |
| % Phenolic on total binder | | 25.00% | 25.00% | 25.00% | 25.00% | 25.00% | 25.00% | 25.00% | 25.00% |
| % $H_3PO_4$ catalyst on total solids | | 4.00% | 4.00% | 4.00% | 4.00% | 4.00% | 4.00% | 4.00% | 4.00% |

TABLE 12

Gold Coating Properties

| Examples | MEK double Rubs | Pass % of wedge bend | Crazing rating | Total Retort % |
|---|---|---|---|---|
| CGF-4 | 100+ | 65% | Fail | 52% |
| CGF-5 | 100+ | 65% | Fail | 73% |
| CGF-6 | 100+ | 67% | Fail | 68% |
| CGF-7 | 59 | 60% | Fail | 90% |
| CGF-8 | 100+ | 63% | Fail | 75% |
| CGF-9 | 100+ | 65% | Fail | 85% |
| CGF-10 | 100+ | 64% | Fail | 65% |
| CGF-11 | 100+ | 79% | Fail | 70% |

The invention has been described in detail with reference to the embodiments disclosed herein, but it will be understood that variations and modifications can be effected within the spirit and scope of the invention.

The invention claimed is:
1. A coating composition for metal packaging application, comprising:
  a. a 2,2,4,4-Tetramethyl-1,3-cyclobutanediol (TMCD) polyester, which is the reaction product of the monomers comprising:
    i. TMCD in an amount of 35-80 mole %, based on the total moles of (a)(i-iv),
    ii. 1,4-cyclohexanedimethanol (1,4-CHDM) in an amount of 20-65 mole %, based on the total moles of (a)(i-iv),
    iii. a diol other than TMCD and other than 1,4-CHDM in an amount of 0-25 mole %, based on the total moles of (a)(i-iv),
    iv. trimethylolpropane (TMP) in an amount of 0-5 mole %, based on the total moles of (a)(i-iv),
    v. an aromatic diacid in an amount of 90-100 mole %, based on the total moles of (a)(v-vi), and
    vi. an aliphatic diacid in an amount of 0-10 mole %, based on the total moles of (a)(v-vi),
  b. a modifying polyester which is the reaction product of the monomers comprising:
    i. a cyclic diol in an amount of 30-55 mole %, based on the total moles of (b)(i-iii),
    ii. 2-methyl-1,3-propanediol (MPdiol) in an amount of 30-67 mole %, based on the total moles of (b)(i-iii),
    iii. trimethylolpropane (TMP) in an amount of 3-20 mole %, based on the total moles of (b)(i-iii),
    iv. terephthalic acid (TPA) or isophthalic acid (IPA) or a mixture thereof in an amount of 55-85 mole %, based on the total moles of (b)(iv-v), and v. an aliphatic diacid in an amount of 15-45 mole %, based on the total moles of (b)(iv-v), and c. one or more crosslinkers selected from the group consisting of resole phenolic resin, isocyanate, and amino resin crosslinkers, wherein said TMCD polyester has a glass transition temperature (Tg) of 60-110° C., acid number of 0-8 mg KOH/g), hydroxyl number of 3-25 mgKOH/g, number average molecular weight of 5,000-20,000 g/mole, and weight average molecular weight of 10,000-100,000 g/mole; said modifying polyester has a Tg of 20-50° C., acid number of 0-10 mg KOH/g, hydroxyl number of 30-60 mgKOH/g, Mn of 2,000-10,000 g/mole, and Mw of 10,000-150,000 g/mole; and wherein said coating has a solvent resistance of greater than 70 MEK double rubs as measured by ASTM D7835, a wedge bend resistance (% pass) of 60-100 as measured by the method of ASTM D3281.

2. The coating composition of claim 1, wherein said diol other than TMCD and other than 1A-CHDM (a)(iii) is selected from the group consisting of 2-methyl-1,3-propanediol (MPdiol), 1,6-hexanediol, and a mixture thereof.

3. The coating composition of claim 1, wherein said aromatic diacid (a)(v) is IPA, TPA, or a mixture thereof.

4. The coating composition of claim 1, wherein said aliphatic diacid (a)(vi) is selected from the group consisting of adipic acid, cyclohexane dicarboxylic acid, dimethyl cyclohexane dicarboxylate, and mixtures thereof.

5. The coating composition of claim 1, wherein said TMCD polyester (a) has a hydroxyl number of 10-25 mgKOH/g.

6. The coating composition of claim 1, wherein said TMCD polyester (a) has a Tg of 70-110° C.

7. The coating composition of claim 1, wherein said cyclic diol (b)(i) is selected from the group consisting of tricyclodecanedimethanol (TCDDM), and a mixture thereof.

8. The coating composition of claim 1, wherein said aliphatic diacid (b)(v) is selected from the group consisting of adipic acid, sebacic acid, and a mixture thereof.

9. The coating composition of claim 1, wherein said modifying polyester (b) has a hydroxyl number of 40-50 mgKOH/g.

10. The coating composition of claim 1, wherein said modifying polyester (h) has a Tg of 20-40° C.

11. The coating composition of claim 1, wherein said TMCD polyester (a) is in an amount of 45-65 weight % and the modifying polyester (b) is in an amount of 35-55 weight %, based on the total weight of (a) and (b).

12. The coating composition of claim 1, wherein the crosslinker (c) is resole phenolic resin, isocyanate, or a mixture thereof.

13. The coating composition of claim 12, wherein the crosslinker (c) is a mixture of a resole phenolic resin and isocyanate, and wherein said resole phenolic resin is in an amount of 70-90 weight % and said isocyanate in an amount of 10-30 weight %, based on the total weight of the crosslinkers.

14. The coating composition of claim 1, wherein said resole phenolic resin comprises residues of m-substituted phenol.

15. The coating composition of claim 1, wherein the total amount of TMCD polyester (a) and the modifying polyester (b) is in an amount of 50-90 weight % and said crosslinker (c) in an amount of 10-50 weight %, based on the total weight of (a), (b), and (c).

16. The coating composition of claim 1, further comprising one or more organic solvents selected from the group consisting of xylene, methyl amyl ketone, 2-butoxyethanol, ethyl-3-ethoxypropionate, toluene, butanol, cyclopentanone, cyclohexanone, ethyl acetate, butyl acetate.

17. The coating composition of claim 1, wherein said coating has a solvent resistance of greater than 70 MEK double rubs as measured by the method of ASTM D7835, a wedge bend resistance (% pass) of 65-100 as measured by the method of ASTM D3281.

18. A coating composition for gold-color coating having improved coating properties for metal packaging application, which comprises:

a. a 2,2,4,4-Tetramethyl-1,3-cyclobutanediol (TMCD) polyester in an amount of 30-40 weight % based on the total weight of (a), (b), (c), and (d), which is the reaction product of the monomers comprising:
  i. TMCD in an amount of 35-80 mole %, based on the total moles of (a)(i-iv),
  ii. 1,4-cyclohexanedimethanol (1,4-CHDM) in an amount of 20-65 mole %, based on the total moles of (a)(i-iv),
  iii. a diol other than TMCD and other than 1,4-CHDM in an amount of 0-25 mole %, based on the total moles of (a)(i-iv),
  iv. trimethylolpropane (TMP) in an amount of 0-5 mole %, based on the total moles of (a)(i-iv),
  v. an aromatic diacid in an amount of 90-100 mole %, based on the total moles of (a)(v-vi), and
  vi. an aliphatic diacid in an amount of 0-10 mole %, based on the total moles of (a)(v-vi), b. a modifying polyester in an amount of 30-40 weight % based on the total weight of (a), (b), (c), and (d), which is the reaction product of the monomers comprising:
  i. a cyclic diol in an amount of 30-55 mole %, based on the total moles of (b)(i-iii),
  ii. 2-methyl-1,3-propanediol (MPdiol) in an amount of 30-67 mole %, based on the total moles of (b)(i-iii),
  iii. trimethylolpropane (TMP) in an amount of 3-20 mole %, based on the total moles of (b)(i-iii),
  iv. terephthalic acid (TPA) or isophthalic acid (IPA) or a mixture thereof in an amount of 55-85 mole %, based on the total moles of (b)(iv-v), and
  v. an aliphatic diacid in an amount of 15-45 mole %, based on the total moles of (b)(iv-v), c. a resole phenolic resin in an amount of 15-30 weight % based on the total weight of (a), (b), and (c), and d. isophorone diisocyanate (IPDI) in an amount of 5-15 weight % based on the total weight of (a), (b), and (c), wherein said TMCD polyester has a glass transition temperature (Tg) of 60-110° C., acid number of 0-8 mg KOH/g), hydroxyl number of 3-25 mgKOH/g, number average molecular weight (Mn) of 5,000-20,000 g/mole, and weight average molecular weight (Mw) of 10,000-100,000 g/mole; said modifying polyester has a Tg of 20-50° C., acid number of 0-10 mg KOH/g, hydroxyl number of 30-60 mgKOH/g, Mn of 2,000-10,000 g/mole, and Mw of 10,000-150,000 g/mole; and wherein said coating has a solvent resistance of greater than 70 MEK double rubs as measured by ASTM D7835, a wedge bend resistance (% pass) of 60-100 as measured by the method of ASTM D3281.

19. An article, of which at least a portion is coated with the coating composition of claim 1.

* * * * *